(12) United States Patent
Ohtsuki et al.

(10) Patent No.: US 6,637,754 B1
(45) Date of Patent: Oct. 28, 2003

(54) WHEEL BEARING AND SEALING DEVICE THEREFOR

(75) Inventors: Hisashi Ohtsuki, Iwata (JP); Takayuki Norimatsu, Iwata (JP); Eiji Funahashi, Iwata (JP); Koji Kametaka, Iwata (JP); Motoharu Niki, Osaka (JP); Katsumi Sugiyama, Iwata (JP)

(73) Assignee: NTN Corporation, Osaka (JP)

( * ) Notice: Subject to any disclaimer, the term of this patent is extended or adjusted under 35 U.S.C. 154(b) by 63 days.

(21) Appl. No.: 09/709,390

(22) Filed: Nov. 13, 2000

(30) Foreign Application Priority Data

| Nov. 17, 1999 | (JP) | ............................. 11-327049 |
| Feb. 1, 2000 | (JP) | ............................. 2000-023814 |
| Feb. 1, 2000 | (JP) | ............................. 2000-023815 |
| Feb. 1, 2000 | (JP) | ............................. 2000-023816 |
| May 9, 2000 | (JP) | ............................. 2000-135513 |

(51) Int. Cl.[7] ............................. F16J 15/32; F16C 33/76
(52) U.S. Cl. ..................... 277/549; 277/562; 277/571; 384/448; 384/486
(58) Field of Search ............................. 277/500, 549, 277/562, 571, 572; 384/448, 486, 478

(56) References Cited

U.S. PATENT DOCUMENTS 5,407,213 A * 4/1995 Ouchi et al. ............... 277/317
5,431,413 A * 7/1995 Hajzler ....................... 277/317
5,611,545 A * 3/1997 Nicot ......................... 277/402
6,045,133 A * 4/2000 Lannert et al. ............. 277/321

* cited by examiner

Primary Examiner—Anthony Knight
Assistant Examiner—E Peavey
(74) Attorney, Agent, or Firm—Sughrue Mion, PLLC

(57) ABSTRACT

A wheel bearing includes a sealing device 5 positioned between inner and outer members 1 and 2. This sealing device 5 includes an elastic member 14, which eventually forms an encoder grid and is provided on a first annular sealing plate 11. A second annular sealing plate 12 is provided with sealing lips 16a to 16c. An engagement 18 between a cylindrical wall 11a of the first annular sealing plate 11 and the inner member 1 is provided with an elastic member 20 made of a material dissimilar to that for the elastic material 14. This elastic member 20 may be a rubber coated layer, resin paint layer, a thin film of adhesive material or a ring-shaped rubber member. Thereby, any possible ingress of water across an engagement surface of the annular sealing plate is prevented, accompanied by increase of the lifetime of the bearing, with no problem associated with separation and displacement of the annular sealing plates. The magnetic flux density can also be easily secured.

9 Claims, 27 Drawing Sheets

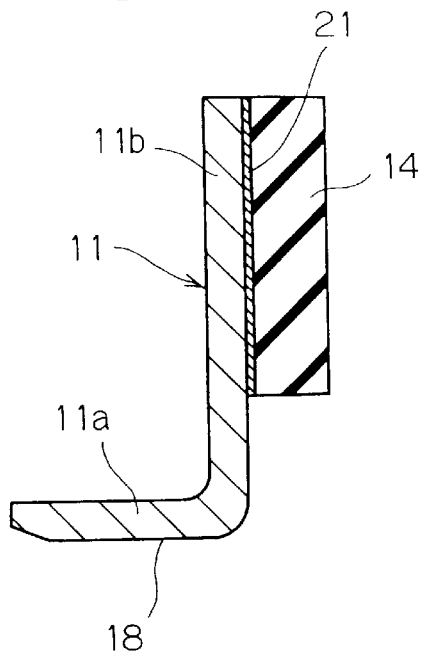
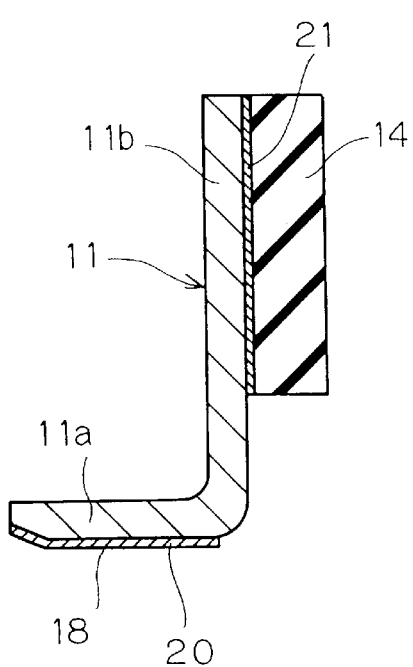
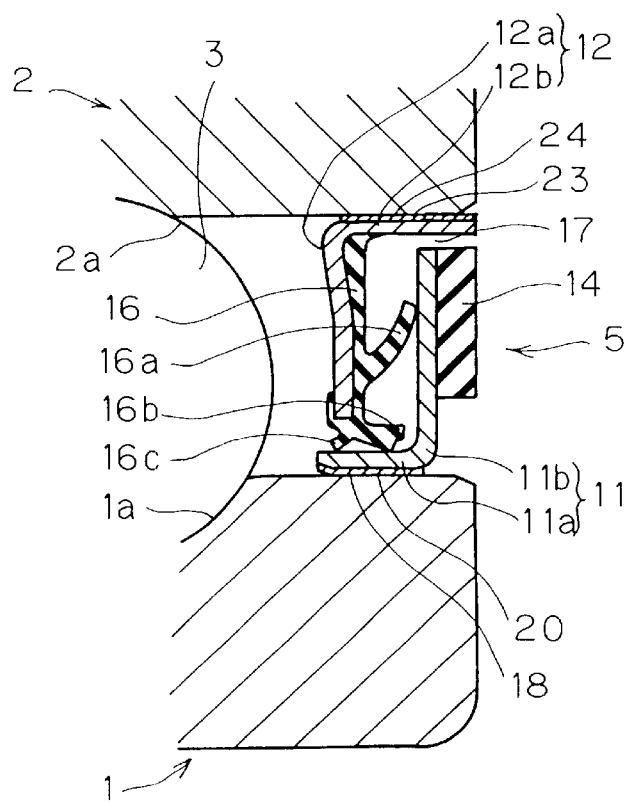

WHEEL BEARING AND SEALING DEVICE THEREFOR

BACKGROUND OF THE INVENTION

1. Field of the Invention

The present invention generally relates to a sealing device in a wheel bearing for an automobile or the like and, more particularly, to the sealing device of a kind integrated together with an encoder grid.

2. Description of the Prior Art

The wheel bearing including, as shown in FIG. 37, a sealing device 105 interposed between an inner member 101 and an outer member 102 rotatable to each other through a circular row of rolling elements 103 has been well known in the art. The sealing device 105 shown therein includes an encoder grid 106 integrated together therewith. In this connections see the Japanese Laid-open Patent Publication No. 6-281018. The prior art sealing device 105 includes generally L-sectioned first and second annular sealing plates 107 and 108 fitted respectively to the inner and outer members 101 and 102 with an elastically deformable sealing lip member 109 secured to the second annular sealing plate 108 so as to intervene between the first and second annular sealing plates 107 and 108. The first annular sealing plate 107 is generally referred to as a slinger. The encoder grid 106 is made of an elastic material mixed with a powder of magnetic particles and is bonded by vulcanization to the first annular sealing plate 107. This encoder grid 106 is of an annular configuration having a plurality of pairs of magnetically opposite poles alternating over the circumference thereof and is cooperable with a magnetic sensor 110 disposed externally in face-to-face relation with the encoder grid 106 for detection of the encoder grid 106.

The first annular sealing plate 107 serving as the slinger and the inner member 101 serving as a rotatable member are engaged with each other under interference fit at an engagement interface 111. However, it has been found that a small quantity of water often ingresses externally into the wheel bearing through the engagement interface 111. Once water ingresses, the first and second annular sealing plates 107 and 108 gather rust, resulting a premature wear of the sealing lip member 109. Also, the grease is prematurely degraded to such an extent as to result in reduction of the lifetime of the wheel bearing.

In view of the foregoing, it has been suggested to reconfigure the encoder grid 106 so that a portion of the elastic material forming the encoder grid 106 extends to an inner peripheral surface of the first annular sealing plate 107 to thereby increase the sealability at the engagement interface 111. However, since the elastic material forming the encoder grid 106 is mixed with the powder of magnetic particles, not only becomes the encoder grid 106 expensive to manufacture, but a required sealing performance is difficult to attain. Also, formation of a relatively thick rubber layer at the engagement interface 111 between the first annular sealing plate 107 and the inner member 101 results in an insufficient engagement therebetween with the consequence that there is a high risk of the first annular sealing plate 107 being separated from the wheel bearing and/or displaced internally of the wheel bearing.

Although instead of the intervention of the elastic material the first annular sealing plate 107 may be made of a soft material to thereby increase the adherence, such soft material is normally of a non-magnetic nature and, therefore, the first annular sealing plate 107 made of such material will fail to provide a magnetic core for the encoder grid 106, resulting in an insufficient density of magnetic fluxes.

The first annular sealing plate 107 may exhibit a sufficient resistance to rusting if it is made of magnetic stainless steel (for example, SUS 430MA) of a kind having a resistance to rusting comparable to that of SUS 304, rather than a generally utilized magnetic material such as SUS 430 of a kind lacking a sufficient resistance to rusting. The magnetic stainless steel referred to above may be SUS 430MA consisting of a stainless steel such as SUS 430 mixed with niobium, Ni or the like to increase the resistance to rusting. As regards the magnetic flux density, SUS 430MA is comparable to SUS 430. However, not only is the magnetic stainless steel referred to above expensive, but even though such material is employed for the first annular sealing plate 107, ingress of water cannot be sufficiently prevented, and therefore, reduction of the lifetime of the wheel bearing as a result of degradation of the grease in contact with water cannot be avoided sufficiently.

FIG. 38 illustrates another prior art wheel bearing. In this figure, components identical with or similar to those shown in FIG. 37 are shown by like reference numerals used in FIG. 37. The sealing device 105 shown in FIG. 38 is shown as employed in the rolling bearing of a type having an inner race rotatable relative to an outer race. The sealing device 105 includes a slinger 107 press-fitted to an outer peripheral end face of the inner race 101, a core metal 108 press-fitted to an inner peripheral end face of the outer race 102 in face-to-face relation with the slinger 107, a sealing member 109 fitted to the core metal 108 and held in sliding contact with the slinger 107, and a rubber magnet 106 bonded by vulcanization to the slinger 107. The rubber magnet 106 referred to above is a pulse generating ring generally used for speed control of a vehicle such as, for example, an automobile. The slinger 107 is of a structure including an cylindrical body 107a having an outer edge formed integrally with a radial flange 107b that protrudes radially outwardly towards the outer race 102. The core metal 108 is of a structure including a cylindrical body 108a press-fitted to the inner peripheral end face of the outer race 102 and formed integrally with an radial flange 108b that protrudes radially inwardly towards the inner race 101 from an inner end thereof adjacent the circular row of the rolling elements 103. An outer end 108aa of the hollow cylindrical body 108a is slightly radially inwardly bent to accommodate the sealing member 109.

The sealing device 105 of the structure shown in FIG. 38 and described above is mounted in position inside the rolling bearing in the manner which will now be described. After the sealing device 105 has been assembled separate and independent of the rolling bearing, the sealing device 105 is press-fitted into the rolling bearing with the slinger 107 mounted on the inner race 101 and the core metal 108 fitted inside the outer race 102. During the press-fitting of the sealing device 105, a plurality of the sealing devices 105 stacked on a support table 114 as shown in FIG. 39 are delivered one by one into a chute by means of a handling unit of an automatic press-fitting machine and is then picked up to be press-fitted in the rolling bearing.

However, since the sealing device 105 shown in FIG. 38 is of a design integrated together with the rubber magnet 106, stacking on the support surface 114 (FIG. 39) the plural sealing devices 105 with the core metal 108 held in contact with the support surface 114 and with the slinger 107, bonded by vulcanization with the corresponding rubber magnet 106, positioned on one side of such core metal 108 remote from the support surface 114 results in contact of the rubber magnet 106 on the slinger 107 in one of the sealing devices 105 with the core metal 108 of the next adjacent sealing device 105 positioned immediately above such one of the sealing devices 105. Considering that the rubber magnet 106 exerts a magnetic force of attraction, the rubber magnet 106 in one of the sealing devices 105 attracts the core metal 108 in the next adjacent sealing device 105 positioned immediately above such one of the sealing devices 105 and, accordingly, a trouble often occurs in delivering the sealing devices 105 one by one by means of the handling unit of the automatic press-fitting machine, thereby hampering a smooth automatic press-fitting.

SUMMARY OF THE INVENTION

In view of the foregoing, the present invention has for its object to provide a sealing device for a wheel bearing effective to avoid any possible ingress of water through the engagement interface of the annular sealing plate to thereby increase the lifetime of the wheel bearing, substantially free from any possible problem associated with separation and/or displacement of the annular sealing plate and effective to secure a magnetic flux density.

The present invention has for its additional object to provide a sealing device for a rolling bearing effective to avoid any possible magnetic attraction between the neighboring sealing devices when the latter are stacked on a support table of the handling device so that the sealing devices can be transported into a chute one by one with no trouble to allow the individual sealing devices to be automatically press-fitted into the corresponding rolling bearings smoothly.

A wheel bearing according to a first aspect of the present invention includes an inner member, an outer member, a circular row of rolling elements interposed between the inner and outer members, and a sealing device for sealing an annular end space delimited between the inner and outer members. The sealing device includes:

first and second annular sealing plates secured respectively to one of the first and second members and the other thereof, and disposed in face-to-face relation to each other;

each of the first and second annular sealing plates including a cylindrical wall and a radial wall assembled together to represent a generally L-shaped section;

the first annular sealing plate being mounted on one of the inner and outer members which is rotatable relative to the other of the inner and outer members, with the radial wall positioned on one side adjacent an exterior of the bearing;

a first elastic member mixed with a powder of magnetic particles and bonded by vulcanization to the radial wall of the first annular sealing plate, the first elastic member being formed with a magnetized portion in which opposite magnetic poles are formed alternately in a direction circumferentially thereof;

the second sealing plate including an elastic sealing member, the elastic sealing member being formed integrally with a side sealing lip slidingly engageable with the radial wall of the first annular sealing plate and a radial sealing lip slidingly engageable with the cylindrical wall of the first annular sealing plate;

the cylindrical wall of the second annular sealing plate being spaced a slight radial gap from a free periphery of the radial wall of the first annular sealing plate; and a second elastic material made of a material different from that of the first elastic member bonded to the radial wall and interposed at an engagement of the first annular sealing plate with such one of the first and second members which is rotatable.

According to the above described construction, since the radial wall of the first annular sealing plate is bonded by vulcanization with the first elastic member mixed with the powder of magnetic particles and magnetized to opposite magnetic poles alternating in a circumferential direction thereof, a so-called encoder grid is formed by the magnetized portion comprises of the first elastic member and rotation detection is possible with a magnetic sensor confronting the magnetized portion.

With respect to the sealing between the inner and outer members, a seal is obtained by sliding engagement of the various sealing lips provided in the second annular sealing plate with the first annular plate and by a labyrinth seal formed by disposition of the radial free periphery or free edge of the radial wall of the first annular sealing plate spaced a slight distance from the cylindrical wall of the second annular sealing plate to provide the radial gap.

As regards the engagement between the first annular sealing plate and the rotatable side member, the interposition of the second elastic member is effective to fill up minute interstices resulting from the shape and the surface roughness of the engagement, to thereby increase the effect of avoiding ingress of water. Since this second elastic member is made of a material different from that for the first elastic member mixed with the powder of magnetic particles to provide the encoder grid, a high sealability can be obtained by properly selecting the material. For this reason, without allowing the greases to be deteriorated in contact with water that has ingressed, the lifetime of the bearing can be increased. Also, since the second elastic member provides a sealing at the engagement, material for the first annular sealing plate is not limited and if the magnetic material is employed therefor, the magnetic flux density of the encoder grid formed by the elastic member provided in the radial wall thereof can be increased by such magnetic material.

In a preferred embodiment according to the first aspect of the present invention, the second elastic member interposed at the engagement of the first annular sealing plate may be a coated layer of rubber material applied to the first annular sealing plate.

If the second elastic member is comprised of the coated layer of rubber material, any possible reduction of the engaging force at the engagement of the first annular sealing plate, which would otherwise result from because of the second elastic member, can be avoided. For this reason, while the sealability be increased, any possible separation and/or displacement of the first annular sealing plate can also be avoided.

In another preferred embodiment according to the first aspect of the present invention, the second elastic member interposed at the engagement of the first annular sealing plate may be a layer of paint material applied to the first annular sealing plate and having a rust preventive property.

Even though the second elastic member is a layer of paint material, that is, a paint layer, any possible reduction of the force of engagement at the engagement of the first annular sealing plate, which would otherwise result from because of the second elastic member, can be avoided and, while the sealability be increased, any possible separation and/or displacement of the first annular sealing place can also be avoided. Also, since the paint material is of a kind having a rust preventive property, the first annular sealing plate can exhibit a rust proof and, therefore, the magnetic material can be selected for the first annular sealing plate with no possibility of being rusted The paint material referred to above may be a polyethylene rubber paint.

In a further preferred embodiment according to the first aspect of the present invention, the second elastic member interposed at the engagement of the first annular sealing plate may be a layer of adhesive material applied to the first annular sealing plate and having a rust preventive property. The adhesive material referred to above may be a resinous room temperature setting adhesive having an anaerobic property.

Where the adhesive layer is interposed, the adhesive material effectively fill up minute interstices resulting from the shape and the surface roughness of the engagement, to thereby increase the force of engagement of the annular sealing plate to thereby increase the sealability. The resinous room temperature setting adhesive having an anaerobic property has a low cure rate when in contact with air, but can relatively quickly cure at room temperatures when applied to the engagement surface 18 where air is barely present. Accordingly, the size of a play between the first annular sealing plate and the inner or outer member engaged therewith for interference fit can be minimized to increase the assemblage.

In a still further preferred embodiment according to the first aspect of the present invention, the surface of the first annular sealing plate which forms the engagement preferably has a surface roughness not greater than Rmax. 3.0, where Rmax represents a maximum height of surface profile. The surface roughness may be chosen Rmax 0.5–2.2.

The more coarse the surface of the annular sealing plate, the higher the bonding strength of the second elastic member in the form of a thin film. However, if the surface of the annular sealing plate is too coarse, the dimensional precision of the surface of the annular sealing plate is lowered. Although hitherto the surface of the first annular sealing plate which forms the engagement has been chosen to be of Rmax greater than 3.0 and not greater than 7.5, selection of the surface roughness not greater than Rmax 3.0 is effective to maintain the dimensional precision of the inner diameter of the second elastic member while securing a sufficient bonding strength of the second elastic member.

In a still further preferred embodiment according to the first aspect of the present invention, the inner member may have an outer peripheral surface formed with an annular groove, and the second elastic member of the different material is a ring-shaped rubber member, and the first annular sealing plate is mounted on the inner member through the ring-shaped rubber member. When the annular groove is formed in the outer peripheral surface of the inner member, it is possible to cause the annular groove to trap water when the latter ingresses. Also, the sealability can be increased by the use of the ring-shaped rubber member mounted in the annular groove.

In a still further preferred embodiment according to the first aspect of the present invention, an annular joint between the cylindrical wall and the radial wall of the first sealing plate may be provided with a folded portion that extends radially inwardly from the radial wall and joined to the cylindrical wall after having been turned backwards and, on the other hand, an annular depression may be formed on an outer peripheral end surface of the inner member by radially inwardly depressing to provide a reduced diameter portion. In this case, the first annular sealing plate is mounted on the inner member with the folded portion positioned within the annular depression, and the second elastic member of the different material is a ring-shaped rubber member that is interposed between an annular side face of the annular depression and the folded portion.

When the first annular sealing plate is mounted on the inner member with the folded portion positioned within the annular depression in the manner described above, the passage for the flow of water represents a tortuous configuration, making it difficult for the water to ingress into the interior of the bearing. Also, the interposition of the ring-shaped rubber member between an annular side face of the annular depression and the folded portion is effective to provide a sufficient sealability. In addition, the provision of the folded portion is effective not only to increase the rigidity of the first annular sealing plate itself, but also the press work to form the first annular sealing plate can be performed with little elastic region (spring back) of the material left therein, and any possible deformation of the first annular sealing plate which would otherwise occur when heated to an elevated temperature during a subsequent heat treatment and/or vulcanization of the rubber material for the elastic member can advantageously be avoided. For this reason, the shape precision of the first annular sealing plate can be increased and the sealability due to engagement can further be increased.

In a still further preferred embodiment according to the first aspect of the present invention, an annular depression may be formed on an outer peripheral end surface of the inner member by radially inwardly depressing to provide a reduced diameter portion, and the first annular sealing plate may be mounted on the annular depression with the cylindrical wall thereof engaged with an outer peripheral surface of the annular depression. In this case, the second elastic member of the different material is preferably a ring-shaped rubber member that is interposed between an axial free end of the cylindrical wall of the first annular sealing plate and an annular side face of the annular depression.

In this structure, by allowing the second elastic member, in the form of the ring-shaped rubber member, to elastically contact the annular side face of the annular depression, even though dusts ingress through the engagement, further ingress thereof into the interior of the bearing can be prevented by the second elastic member. Also, since a major portion of the cylindrical wall of the first annular sealing plate is engaged directly on the inner member, a high force of engagement can be obtained. Thus, this structure is excellent in that any possible separation and/or displacement of the sealing plate can advantageously be prevented.

In a still further preferred embodiment according to the first aspect of the present invention, the cylindrical wall of the first annular sealing plate may be formed with a stop member which is in tun engaged in an annular groove defined on the outer peripheral surface of the inner member. By allowing the stop member to engage in the annular groove, any possible axial displacement of the first annular sealing plate can be avoided. For this reason, while the second elastic member is interposed at the engagement of the first annular sealing plate, any possible separation and/or displacement can be assuredly prevented.

The stop member referred to above may be comprised of a bent end formed at an axial free end of the cylindrical wall of the first annular sealing plate. If the stop member is represented by the bent end of the axial free end portion of the cylindrical wall of the first annular sealing plate, it can easily be formed. Also, since the stop member is provided at the axial free end of the cylindrical wall, the stop member will not provide any obstruction and the cylindrical wall can easily be mounted onto the inner member.

Alternatively, the stop member may be comprised of a plurality of protuberances formed on the cylindrical wall of the first annular sealing plate at a position generally intermediate of an axial length of the cylindrical wall and spaced a distance from each other in a direction circumferentially of the cylindrical wall of the first annular sealing plate. If the stop member is in the form of the plural protuberances, the stop member can easily be formed and formation of the stop member is effective to avoid any possible reduction of the area of surface of engagement.

Again alternatively, the stop member may be comprised of an annular projection formed in the cylindrical wall of the first annular sealing plate at a location generally intermediate of an axial length of the cylindrical wall and extending circumferentially of the cylindrical wall. Even when the stop member is in the form of the annular projection, the stop member can easily be formed. Also, when the stop member is in the form of the annular projection, the effect of preventing the first annular sealing plate from being displaced is high.

According to the second aspect of the present invention, there is provided a wheel bearing including an inner member, an outer member, a circular row of rolling elements interposed between the inner and outer members, and a sealing device for sealing an annular end space delimited between the inner and outer members. This sealing device includes:

first and second annular sealing plates secured respectively to one of the first and second members and the other thereof, and disposed in face-to-face relation to each other;

each of the first and second annular sealing plates including a cylindrical wall and a radial wall assembled together to represent a generally L-shaped section;

the first annular sealing plate being mounted on one of the inner and outer members which is rotatable relative to the other of the inner and outer members, with the radial wall positioned on one side adjacent an exterior of the bearing;

a first elastic member mixed with a powder of magnetic particles and bonded by vulcanization to the radial wall of the first annular sealing plate, the first elastic member being formed with a magnetized portion in which opposite magnetic poles are formed alternately in a direction circumferentially thereof;

the second sealing plate including an elastic sealing member, the elastic sealing member being formed integrally with a side sealing lip slidingly engageable with the radial wall of the first annular sealing plate and a radial sealing lip slidingly engageable with at least one of the cylindrical wall of the first annular sealing plate and the one of the inner and outer members which is rotatable;

the cylindrical wall of the second annular sealing plate being spaced a slight radial gap from a free periphery of the radial wall of the first annular sealing plate; and the elastic sealing member having an elastic projection formed therewith so as to extend outwardly therefrom, the elastic projection being elastically engaged with a connecting member that is held in contact with an annular axial end face of the inner member.

In the case of this structure, similarly to the first aspect of the present invention, a so-called encoder grid is formed by the magnetized portion, and an effective sealing is attained by the sealing lips and a labyrinth seal between the first and second annular sealing plates. Also, by allowing the elastic projection protruding from the elastic member forming the magnetized portion to elastically engage the connecting member that is held in contact with the annular axial end face of the inner member, any possible ingress of water and/or dusts into the interior of the bearing can be prevented. Since the first annular sealing plate is engaged directly with the inner member with no elastic member intervening therebetween, there is no problem associated with reduction in the force of engagement.

The connecting member referred to above may be a constant speed universal coupling having a shoulder that is held in contact with the annular axial end face of the inner member.

Alternatively, the connecting member may be a crimped portion of a barrel hub which is crimpled radially outwardly to confront an axial end of a separate inner race then held in abutment with one end of the barrel hub. In this case, if the crimped portion is utilized as a member contactable with the elastic projection integral with the elastic member, the elastic projection need not be formed in a relatively large size and the elastic contact with the elastic projection is effective to provide a sealing capability.

In any one of the foregoing preferred embodiments according to the second aspect of the present invention, the elastic projection may be of a type elastically held in contact with an outer peripheral surface of the connecting member. Contact of the elastic projection with the outer peripheral surface of the connecting member does not require a dedicated portions on the connecting member to be prepared for contact with the elastic projection and the contact of the elastic projection can be accomplished, thereby enabling the sealing capability to be achieved with a simplified structure.

In any one of the foregoing preferred embodiments according to the second aspect of the present invention, the elastic projection may be elastically held in contact with a side face of the connecting member. Where the elastic projection is held in contact with the side face of the connecting member, the elastic member can be standardized without being restricted by the outer diameter dimension of the connecting member.

In any one of the foregoing preferred embodiments according to the second aspect of the present invention, the radial sealing lip of the second sealing plate may be slidingly engaged with the inner member. Sliding engagement of the radial sealing lip of the second sealing plate with the inner member is effective to further increase the sealability.

Also, in accordance with the third aspect of the present invention, there is provided a wheel bearing including an inner member, an outer member, a circular row of rolling elements interposed between the inner and outer members, and a sealing device for sealing an annular end space delimited between the inner and outer members. The sealing device employed in the wheel bearing according to the third aspect of the present invention includes:

first and second annular sealing plates secured respectively to one of the first and second members and the other thereof, and disposed in face-to-face relation to each other;

each of the first and second annular sealing plates including a cylindrical wall and a radial wall assembled together to represent a generally L-shaped section;

the first annular sealing plate being mounted on one of the inner and outer members which is rotatable relative to the other of the inner and outer members, with the radial wall positioned on one side adjacent an exterior of the bearing;

a first elastic member mixed with a powder of magnetic particles and bonded by vulcanization to the radial wall of the first annular sealing plate, the first elastic member being formed with a magnetized portion in which opposite magnetic poles are formed alternately in a direction circumferentially thereof;

the second sealing plate including an elastic sealing member, the elastic sealing member being formed integrally with a side sealing lip slidingly engageable with the radial wall of the first annular sealing plate and a radial sealing lip slidingly engageable with the cylindrical wall of the first annular sealing plate;

the cylindrical wall of the second annular sealing plate being spaced a slight radial gap from a free periphery of the radial wall of the first annular sealing plate; and of the first and second annular sealing plates, at lest the first annular sealing plate being prepared from a steel plate made of a magnetic material, the steel plate having a surface formed with a metallic layer made of metal having a Yong's modulus of elasticity that is lower than that for the one of the first and second members which is rotatable.

Again, according to the structure described above, a so-called encoder grid is formed by the magnetized portion, and an effective sealing is attained by the sealing lips and a labyrinth seal between the first and second annular sealing plates.

As regards the engagement between the first annular sealing plate and one of the inner and outer members which is on a rotatable side, although minute interstices resulting from the shape and the surface roughness are formed, surface indents forming the minute interstices can advantageously be filled by a soft metal forming the metallic layer since the metallic layer of a metal having a Young's modulus of elasticity smaller than that of the rotatable side member is formed on the surface of the first annular sealing plate, thereby increasing the sealability. Accordingly, without allowing the greases to be deteriorated in contact with water that has ingressed, the lifetime of the bearing can be increased. Also, since a steel plate is employed as material for the first annular sealing plate, the magnetic flux density of the encoder grid can be increased. Since the metallic layer on the surface of the steel plate for the first annular sealing plate is thin, the magnetic flux density will not be little affected even though it is non-magnetic.

In a preferred embodiment according to the third aspect of the present invention, the metallic layer may be a metal plated layer. If the metallic layer is comprised of a metal plated layer, the metallic layer can easily be formed. Also, the metal having the low Young's modulus of elasticity may be selected from the group consisting of zinc, tin, gold, silver and copper.

In another preferred embodiment according to the third aspect of the present invention, the metallic layer may have a thickness within the range of 5 to 30 $\mu$m.

If the surface roughness of the engagement surface of the member on which the first annular sealing plate is mounted is about Rmax 3.0 (or Ra 0.63, where Ra represents a center line average height of surface profile), in order for the resultant minute surface irregularities to be filled up, the thickness of the metallic layer has to be at least not smaller than 5 $\mu$m. On the other hand, even if this thickness is chosen to be not smaller than 30 $\mu$m, effects brought about thereby remain the same and, conversely, the evenness or flatness will be adversely affected, requiring an increased length of time to form the metallic layer together with increase of the cost. For this reason, the thickness of the metallic layer is preferred to be within the above mentioned range. To form the metallic layer of a thickness within the range of 5 to 30 $\mu$m, it is effective where the metallic layer is comprised of a metal plated layer.

In a further preferred embodiment of the present invention according to the third aspect of the present invention, a surface of the first annular sealing plate which forms the engagement may have a surface roughness not greater than Rmax 3.0, more preferably within the range of Rmax 0.5 to 2.2.

While such an annular sealing plate has hitherto been considered having a surface roughness of Rmax greater than 3.0 and not greater 7.5, increase of the degree of surface evenness or flatness is effective to allow the metallic layer to fill up the surface irregularities brought about thereby.

In a still further preferred embodiment of the present invention according to the third aspect of the present invention, a surface of the engagement of one of the first and second members, which is rotatable, with the first annular sealing plate may be formed as a ground surface which has been plunge cut.

With the plunge cutting, the raceway for the rolling elements in the rotatable member and the engagement surface are simultaneously formed by machining or grinding and, therefore, any misalignment therebetween can advantageously be avoided. In other words, if they are separately machined or ground, not only does a misalignment between the engagement surface, which eventually provides a sealing surface, and the raceway occur, but also there is a high risk of ingress of dusts when the engagement surface is machined or grinded without a sensor for sensing machined surface rendering the machined surface spiral. Since the plunge cutting is a technique in which a grinding wheel is applied at right angles to the work to be ground, the above discussed problems can advantageously be eliminated.

Where the engagement surface of the rotatable member where the annular sealing plate is engaged therewith is defined by the plunge cut surface, it is desirable for the engagement surface to be finished to a surface roughness not greater than Rmax 3.0. This engagement surface as well is preferred to be within the range of Rmax 0.5 to 2.2. Even if the degree of the surface evenness of the engagement surface is increased, the function of the metallic layer to fill up the surface irregularities resulting from the surface roughness can be enhanced.

Again, in accordance with the fourth aspect of the present invention, there is provided a wheel bearing including an inner member, an outer member, a circular row of rolling elements interposed between the inner and outer members, and a sealing device for sealing an annular end space delimited between the inner and outer members. This sealing device used therein includes:

first and second annular sealing plates secured respectively to one of the first and second members and the other thereof, and disposed in face-to-face relation to each other;

each of the first and second annular sealing plates including a cylindrical wall and a radial wall assembled together to represent a generally L-shaped section;

the first annular sealing plate being mounted on one of the inner and outer members which is rotatable relative to the other of the inner and outer members, with the radial wall positioned on one side adjacent an exterior of the bearing;

a first elastic member mixed with a powder of magnetic particles and bonded by vulcanization to the radial wall of the first annular sealing plate, the first elastic member being formed with a magnetized portion in which opposite magnetic poles are formed alternately in a direction circumferentially thereof;

the cylindrical wall of the second annular sealing plate being spaced a slight radial gap from a free periphery of the radial wall of the first annular sealing plate; and the second sealing plate including an elastic sealing member, the elastic sealing member being formed integrally with a side sealing lip slidingly engageable with the radial wall of the first annular sealing plate and a radial sealing lip slidingly engageable with an outer peripheral surface of the one of the inner and outer members, which is rotatable, and adjacent an engagement surface of the first annular sealing plate with such one member.

With this structure as described above, a so-called encoder grid is formed by the magnetized portion, and an effective seating is attained by the sealing lips and a labyrinth seal between the first and second annular sealing plates. Since of the elastic sealing lips, the radial sealing lip is held in sliding engagement with the outer peripheral surface adjacent the engagement of the rotatable side member with the annular sealing plate, even though water ingresses across the engagement between the first annular sealing plate and the rotatable side member, further ingress of the water into the interior of the bearing can be prevented by the sliding engagement of the radial sealing lip. For this reason, there is no possibility of the grease being degraded in contact with water and the lifetime of the bearing can be increased. Also, since the sealability can be secured by the radial sealing lip in this way, the material for the first annular sealing plate is not limited and any suitable magnetic material can be employed, allowing the magnetic flux density of the encoder grid, defined by the elastic member provided on the radial wall, to be increased.

In a preferred embodiment according to the fourth aspect of the present invention, an annular depression of a depth corresponding to a thickness of the first annular sealing plate is formed on the rotatable side, and the cylindrical wall of the first annular sealing plate is press-fitted around an outer peripheral surface of the annular depression. If the annular depression is provided and the first annular sealing plate is mounted thereon, any possible axial displacement of the first annular sealing plate towards the interior of the bearing can be prevented and, therefore, the axial position of the first annular sealing plate is limited, thereby securing a proper interference for the elastic side sealing lip. The annular depression referred to above has a small depth corresponding to the thickness of the cylindrical wall of the annular sealing plate, there is no problem associated with reduction in strength of the rotatable side member resulting from the formation of the annular depression and also with increase in size of the first annular sealing plate and also no problem associated with insufficient engagement which would otherwise result from an insufficient depth of the annular depression.

In another preferred embodiment according to the fourth aspect of the present invention, the radial sealing lip of the second sealing plate may be inclined so as to extend outwardly of the bearing. Where the radial sealing lip is inclined so as to extend outwardly of the bearing, as compared with the radial sealing lip inclined so as to extend in a reverse direction, that is, inwardly of the bearing, the effect of preventing water and dusts from ingressing exteriorly into the interior of the bearing can be increased.

In a further preferred embodiment according to the fourth aspect of the present invention, the side sealing lip of the second annular sealing plate may be provided at two locations spaced radially. The side sealing lip functions to prevent any possible flow of water from the outside of the bearing into the interior of the bearing and, therefore, the provision of this side sealing lip at two locations spaced radially inwardly and outwardly is effective to enhance the effect of preventing water ingress into the interior of the bearing.

In a still further preferred embodiment according to the fourth aspect of the present invention, the first annular sealing plate may be made of a ferrite stainless steel. Considering that the ferrite stainless steel is a ferromagnetic material, the use thereof as material for the first annular sealing plate is effective to increase the magnetic flux density of the elastic member defining the encoder grid.

In a still further preferred embodiment of the present invention according to the fourth aspect of the present invention, at least one of a free peripheral edges of the radial wall of the first annular sealing plate and the cylindrical wall of the second sealing plate may be provided with an overhang portion defined by a portion of the elastic member integrated with the annular sealing plate, in which case a maximum diameter portion of the free peripheral edge of the radial wall of the first annular sealing plate including this overhang portion has a diameter greater than a minimum diameter portion of an axial free end of the cylindrical wall of the second annular sealing plate and is positioned inwardly of the bearing from the minimum diameter portion.

According to this embodiment, since the radial sealing lip on the second annular sealing plate is held in sliding contact with the outer peripheral surface of the rotatable side member, and not held in sliding contact with the cylindrical wall of the first annular sealing plate, unless a countermeasure is taken, the first and second annular sealing plates will separate from each other while the sealing device has not yet been assembled into the bearing. For this reason, transportation and an assemblage of the sealing device into the bearing are complicated, accompanied by increase of manufacturing steps. In contrast thereto, since the overhang portion is engageable with the free end of the cylindrical wall of the second annular sealing plate in the axial direction, the possible separation between the first and second annular sealing plates can be prevented in a condition having not yet been assembled, and they can be dealt with as a single component part. Also, since the first and second annular sealing plates are engaged with each other in a manner that is unseparable from each other by means of the overhang portion integral with the elastic member, they can be assembled together or dismantled from each other by virtue of elastic deformation of the overhang portion. Also, the provision of the overhang portion renders the gap, forming the labyrinth seal, to represent a generally tortuous shape, resulting in increase of the sealability.

The present invention provides a sealing device that may be included in the wheel bearing according to any one of the first to fourth aspects of the present invention. In this sealing device, one of the first and second annular sealing plates which is on a fixed side may be made of a metal and such fixed side annular sealing plate or the elastic sealing member mounted thereon may be formed with a projection protruding inwardly of the wheel bearing, which projection is formed so as to be continuous or discontinuous.

It is to be noted that the projections referred to above may be formed integrally with the annular sealing plate.

According to the sealing device of the structure described above, when the sealing device is to be press-fitted to the bearing, a plurality of the sealing devices of an identical structure are placed on a support table, a space corresponding to the amount of protrusion of the annular projection protruding from the outer side face of the annular sealing plate fixed to the fixed member of the bearing and, therefore, the magnetic force of attraction acting to attract one of the sealing devices immediately above the magnetized portion of the other of the sealing devices stacked immediately above the magnetized portion thereof is weakened.

Consequently, the neighboring sealing devices stacked on the support table will not be magnetically attracted with each other and, therefore, the sealing devices can advantageously be transported towards a chute by the handling unit of the automatic press-fitting machine one at a time and are then successively assembled into the respective bearings one at a time.

It is to be noted that in place of the first elastic member including the magnetized portion, the magnetized portion may be formed on the radial wall of the annular sealing plate, that is on the rotatable side, by directly magnetizing such radial wall of such annular sealing plate.

The present invention also provides a sealing device that may be included in the wheel bearing according to any one of the first to fourth aspects of the present invention. In this sealing device, one of the first and second annular sealing plates which is on a fixed side may be made of a metallic non-magnetic material.

According to the sealing device of the structure described above, the magnetic force of attraction emanating from the magnetized portion does not act on the annular sealing plate formed of the non-magnetic material and mounted on the fixed member of one of the sealing devices positioned above the other of the sealing devices. Consequently, the neighboring sealing devices stacked on the support table will not be magnetically attracted with each other.

The non-magnetic material is preferably in the form of an austenite stainless steel because it has a corrosion resistance effective to suppress rusting. Of the stainless steels available, SUS 304 is preferred because it is mass-produced and exhibits a required strength.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 5A and 5B are fragmentary sectional views of the wheel bearing according to a second preferred embodiment in the first aspect of the present invention;

FIG. 6 is a fragmentary sectional view of the wheel bearing according to a third preferred embodiment in the first aspect of the present invention;

DETAILED DESCRIPTION OF THE EMBODIMENTS

Figure 1:
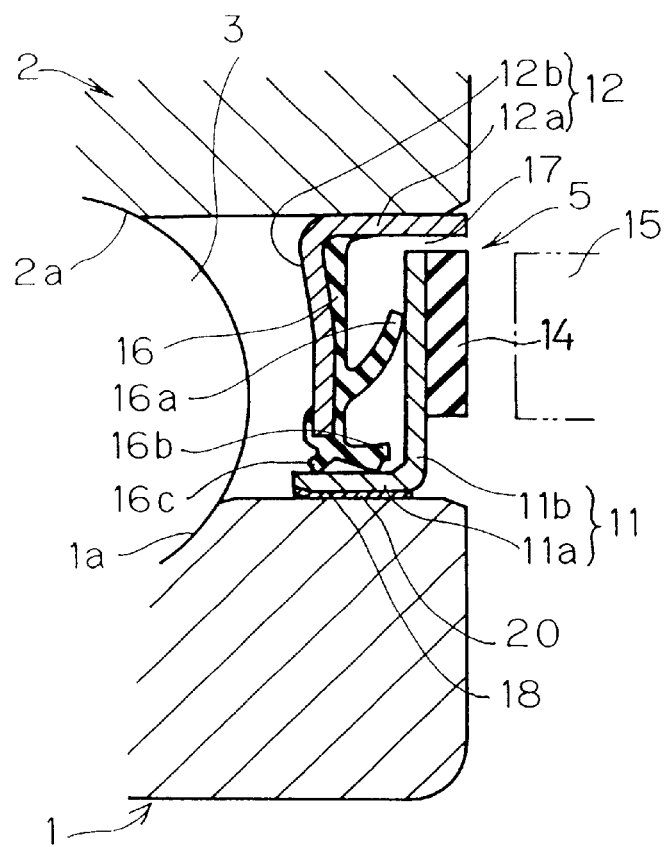
FIG. 1 is a fragmentary sectional view of a wheel bearing according to a first preferred embodiment in the first aspect of the present invention.

Preferred embodiments of the present invention will now be described. Referring first to FIG. 1, a wheel bearing shown therein includes an inner and outer members 1 and 2 rotatable relative to each other, a circular row of rolling elements 3 interposed rollingly between the first and second members 1 and 2, and a sealing device 5 for operatively sealing an annular end space delimited between the inner and outer members 1 and 2. Each of the inner and outer members 1 and 2 has a raceway 1a or 2a defined therein in the form of a generally semicircular sectioned groove. The inner and outer members 1 and 2 rollingly support the circular row of the rolling elements 3 and are positioned radially inwardly and outwardly of the circular row of the rolling element for rotation relative to each other. The inner and outer members 1 and 2 may respectively be inner and outer races of a rolling bearing or bearing inner and outer races combined together with separate component parts. Alternatively, the inner member 1 may be a part of a rotary shaft. The rolling elements 3 may be balls or rollers, but in the illustrated embodiment the rolling elements 3 are employed in the form of balls.

Figure 3:
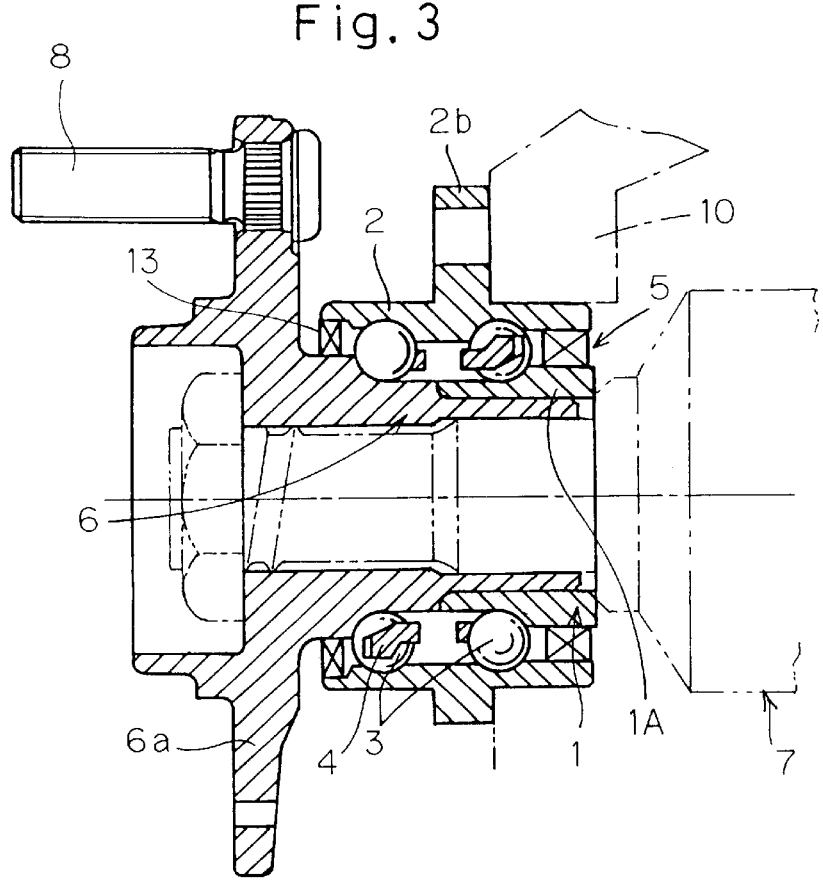
FIG. 3 is a longitudinal sectional view of the wheel bearing shown in FIG. 1.

An example of the entire structure of the wheel bearing is shown in FIG. 3. The wheel bearing shown therein may be in the form of a double row rolling bearing or, specifically, a double row angular bearing and includes a bearing inner race comprised of a barrel hub 6 and a separate inner race 1A mounted externally on one end of the barrel hub 6. The barrel hub 6 and the separate inner race 1A are formed with respective raceways for rollingly accommodating respective circular rows of rolling elements. The separate inner race 1A serves as the inner member 1 in the example shown in FIG. 1. The barrel hub 6 is coupled with one end (for example, an outer race) of a constant speed universal coupling 7 while a wheel (not shown) is bolted to a hub portion 6a of the barrel hub 6 by means of a plurality of bolts 8. The constant speed universal coupling 7 has the opposite end (for example, an inner race) coupled with a drive shaft. The outer member 2 is constituted by a bearing outer race having a flange 2b and is fitted to a housing 10 including a knuckle or the like. This outer member 2 is of a type having raceways defined therein for the respective circular rows of the rolling elements 3. The rolling elements 3 of each circular row are retained in position by a retainer 4. An annular space delimited between the inner and outer members 1 and 2 has one end adjacent a generally intermediate portion of the wheel axle sealed by the sealing device 5. An annular space delimited by the outer member 2 and the barrel hub 6 remote from the sealing device 5 is sealed by a different sealing device 13.

Figure 2:
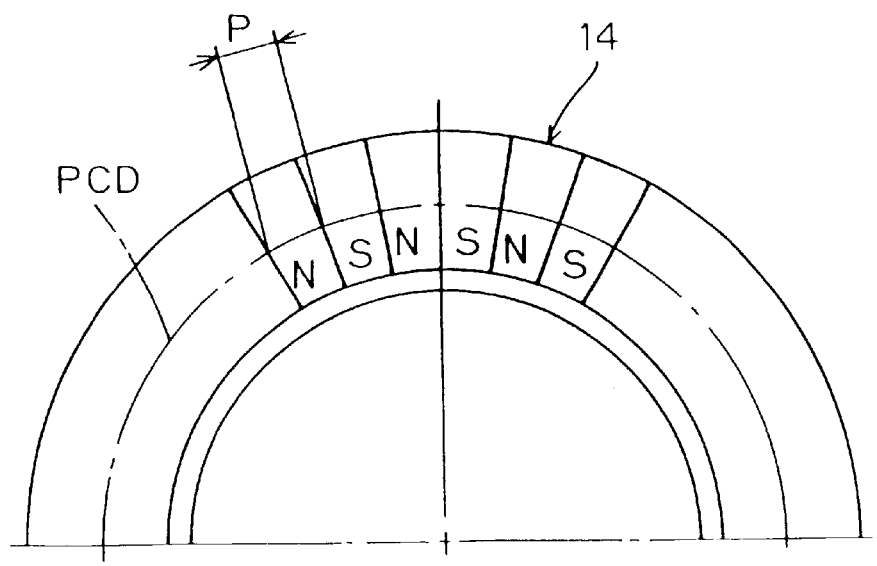
FIG. 2 is a fragmentary front elevational view of an elastic material eventually forming an encoder grid employed in the wheel bearing shown in FIG. 1.

The sealing device 5 includes, as shown in FIGS. 1 and 2, first and second annular sealing plates 11 and 12 fitted to the inner and outer members 1 and 2, respectively. The first and second annular sealing plates 11 and 12 are mounted in position to the inner and outer members 1 and 2 under interference fit, respectively, in face-to-face relation with each other. Each of the first and second annular sealing plates 11 and 12 is of a generally L-shaped section including a cylindrical wall 11a or 12a and a radial wall 11b or 12b.

Of the first and second annular sealing plates 11 and 12, the first annular sealing plate 11 is press-fitted on an outer peripheral surface of the inner member 1 which serves as a rotatable member and as a slinger. The radial wall 11b of the first annular sealing plate 1 is positioned axially outwardly of the bearing or on one side adjacent an exterior of the bearing and is bonded by vulcanization with an annular elastic member 14 mixed with a powder of magnetic particles. This annular elastic member 14 serves as an encoder grid and is formed with a plurality of pairs of magnetically opposite N and S poles alternating in a circular row over the circumference thereof as shown in FIG. 2. Thus, this annular elastic member 14 may be regarded as an annular rubber magnet. The N and S pole regions are arranged alternately at a predetermined pitch p as measured along the pitch circle PCD lying on the shape of a circle concentric with the circular row of the N and S pole regions. Positioned in face-to-face relation with the annular elastic member 14 serving as the encoder grid is a magnetic sensor 15, as shown in FIG. 1, that is cooperable with the annular elastic member 14 to constitute a rotary encoder for detecting the speed of rotation of the wheel.

Figure 4:
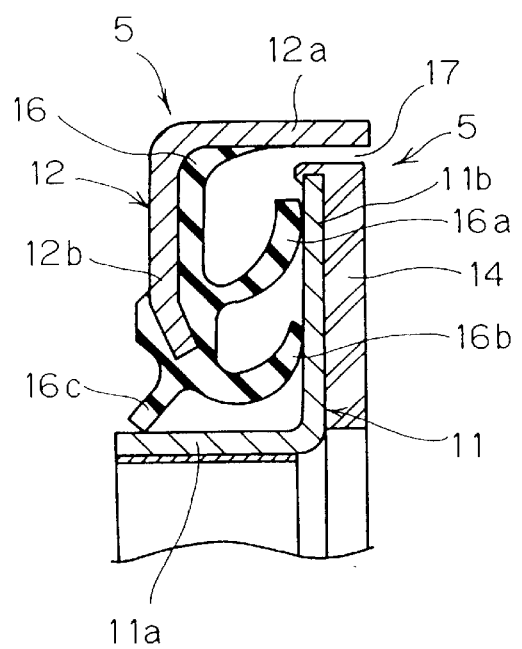
FIG. 4 is a longitudinal sectional view of modified form of elastic sealing member in the wheel bearing of FIG. 1.

The second annular sealing plate 12 is integrated with a side sealing lip 16a, slidingly engaged with the radial wall 11b of the first annular sealing plate 11, and radial sealing lips 16b and 16c slidingly engaged with the cylindrical wall 11a of the first annular sealing plate 11. These sealing lips 16a to 16c form respective parts of an elastic sealing member 16 bonded by vulcanization to the second annular sealing plate 12. The number of elastic sealing lips although shown as three 16a to 16c in the illustrated embodiment may be arbitrarily chosen, but in the illustrated embodiment in FIG. 1, the two radial sealing lips 16c and 16b are employed and positioned axially outwardly and inwardly of the bearing, respectively. The outer radial sealing lip 16b may, if desired, replaced with a side sealing lip as shown in FIG. 4 or dispensed with.

The cylindrical wall 12a of the second annular sealing plate 12 and a free periphery of the radial wall 11b of the first annular sealing plate 11 confront with each other and are spaced a slight radial distance to form an annular gap which defines a labyrinth seal 17.

The first annular sealing plate 11 is preferably made of a steel plate having a magnetic property such as a ferromagnetic property. Examples of such magnetic steel plate include a stainless steel of a ferrite system (for example, SUS 430 as stipulated in the Japanese Industrial Standards) and a rolled steel plate that has been preserved, i.e., subjected to a rust preventive treatment. On the other hand, the second annular sealing plate 12 is preferably made of stainless steel, for example, a stainless steel plate of an austenite system which is non-magnetic (for example, SUS 304) or a rolled steel plate that has been subjected to a rust preventive treatment. By way of example, the first annular sealing plate 11 and the second annular sealing plate 12 may be prepared from the ferrite stainless steel plate and the austenite stainless plate, respectively.

An elastic member 20 made of an elastic material different from that for the elastic member 14 is bonded by vulcanization to an engagement surface 18 of the first annular sealing plate 11, which is held in contact with an outer peripheral surface of the inner member 1 so as to intervene between the cylindrical wall 11a of the first annular sealing plate 11 and that outer peripheral surface of the inner member 1. This elastic member 20 may be made of a rubber material in the form of a thin film or a ring, or any other suitable elastic material. Various specific configurations of the elastic member 20 will now be described.

Where the elastic member 20 is in the form of a thin film, it will be described together with a process of making the same. When a rubber material is to be bonded by vulcanization to a annular sealing plate, it is a general practice to apply a thermosetting bonding material to the annular sealing plate, followed by vulcanization of the rubber material so as to stick to the annular sealing plate. However, where the rubber member 14 that eventually forms the encoder grid and the rubber member 20 that eventually forms a packing dissimilar to the rubber member 14 are to be formed, these dissimilar rubber materials cannot be injected simultaneously into a mold assembly for molding.

In view of the foregoing, by way of example, the elastic member 20 may be formed on the engagement surface 18 of the first annular sealing plate 11 by, for example, spraying a rubber material only to the engagement surface 18 to form a rubber coat after a magnetic rubber material has been bonded by vulcanization with the use of a bonding agent 21 to the first annular sealing plate 11 as shown in FIG. 5A, The elastic member 20 in the form of a thin film may be a layer of resinous paint. By way of example, after the magnetic rubber material has been bonded by vulcanization with the use of a bonding agent 21 to the first annular sealing plate 11 as is the case with the example shown in FIG. 5B, a resinous paint may be sprayed only to the engagement surface 18 to form the elastic member 20. The resinous paint may be a rubber paint of a polyethylene system and may be painted to a film thickness of, for example, 20 µm.

The elastic member 20 in the form of a thin film may be a layer of a bonding material. Even in this case, as is the case with the example shown in FIGS. 5A and 5B, after the magnetic rubber is bonded by vulcanization with the use of a bonding agent 21 to form the elastic member 14, a bonding material for the thin film may be sprayed only to the engagement surface 18 to form the elastic member 20. This bonding material has a rust proof and is preferably employed in the form of a resinous bonding material, more preferably a resinous room temperature setting adhesive having an anaerobic property.

Where the elastic member 20 in the form of a layer of the bonding material is provided on the engagement surface 18, minute surface indentations present on the engagement surface 18 because of its surface roughness can be filled up by the bonding material and, accordingly, not only can a force of engagement of the first annular sealing plate 11 onto the inner member 1 be increased, but the gas tightness can also be increased. The resinous room temperature setting adhesive having an anaerobic property has a low cure rate when in contact with air, but can relatively quickly cure at room temperatures when applied to the engagement surface 18 where air is barely present. Accordingly, the size of a play between the annular sealing plate 11 and the inner member 1 for interference fit can be minimized to increase the assemblage.

Examples of the resinous room temperature setting adhesive having an anaerobic property that can be employed in the practice of the present invention include "Lock-Tight Retaining Compound 680" (product name) and "Lock-Tight 603" (product name) both available from Nippon Lock-Tight Kabushiki Kaisha.

Where the elastic member 20 in the form of a thin film is to be provided at the engagement surface 18 in a manner similar to that described above, the engagement surface 18 has a surface roughness not greater than Rmax 3.0, preferably within the range of 0.5 to 2.2.

Where the annular sealing plate 11 is prepared from a metallic plate, although the surface roughness thereof has hitherto been chosen to be within the range of Rmax 3.0 to 7.5, selection of not greater than Rmax 3.0 for the surface roughness is effective to allow the elastic member 20 to exhibit a sufficient bondability and also to secure the inner diameter to a precise dimension.

Although in the foregoing embodiment the second annular sealing plate 12 has been shown and described as directly engaged in the outer member 2, an elastic member 24 may also be interposed in an engagement 23 between the second annular sealing plate 12 and the outer member 2 as shown in FIG. 6. This elastic member 24 may be in the form of either a thin film or a rubber ring. Where the elastic member 24 is in the form of a thin film, the same material as the elastic member 20 at the engagement surface 18 of the inner member 1 can be employed and may be in the form of a rubber coat, a layer of paint or a layer of adhesive material.

Figure 7:
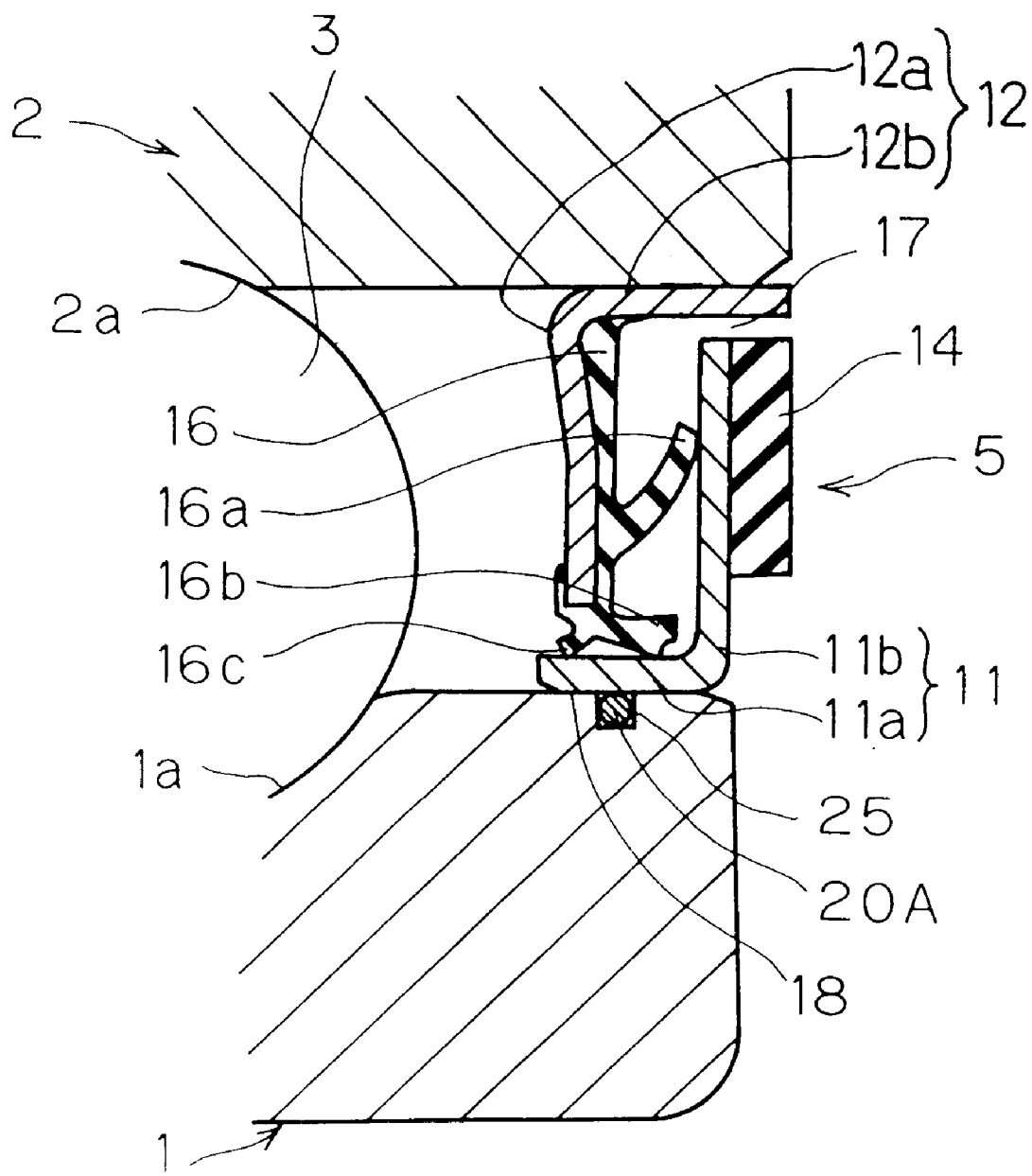
FIG. 7 is a fragmentary sectional view of the wheel bearing according to a fourth preferred embodiment in the first aspect of the present invention.

In an embodiment shown in FIG. 7, instead of the use of the thin film elastic member 20 as shown in FIG. 1, a portion of the outer peripheral surface of the inner member 1 where the first annular sealing plate 11 is mounted is formed with an annular groove 25 and an ring-shaped elastic member 20A made of rubber material is mounted in such annular groove 25. This ring-shaped elastic member 20A is of a size having its outer periphery protruding a slight distance radially outwardly from the outer diameter of the inner member 1 and, therefore, when the cylindrical wall 11a of the first annular sealing plate 11 is press-fitted around the inner member 1, the ring-shaped elastic member 20A functions to prevent muddy water from ingressing across the engagement surface 18.

The ring-shaped elastic member 20A may be employed in the form of an O-ring and, other than the O-ring, a shaft seal having one or more sealing lips may be employed therefor.

Figure 8:
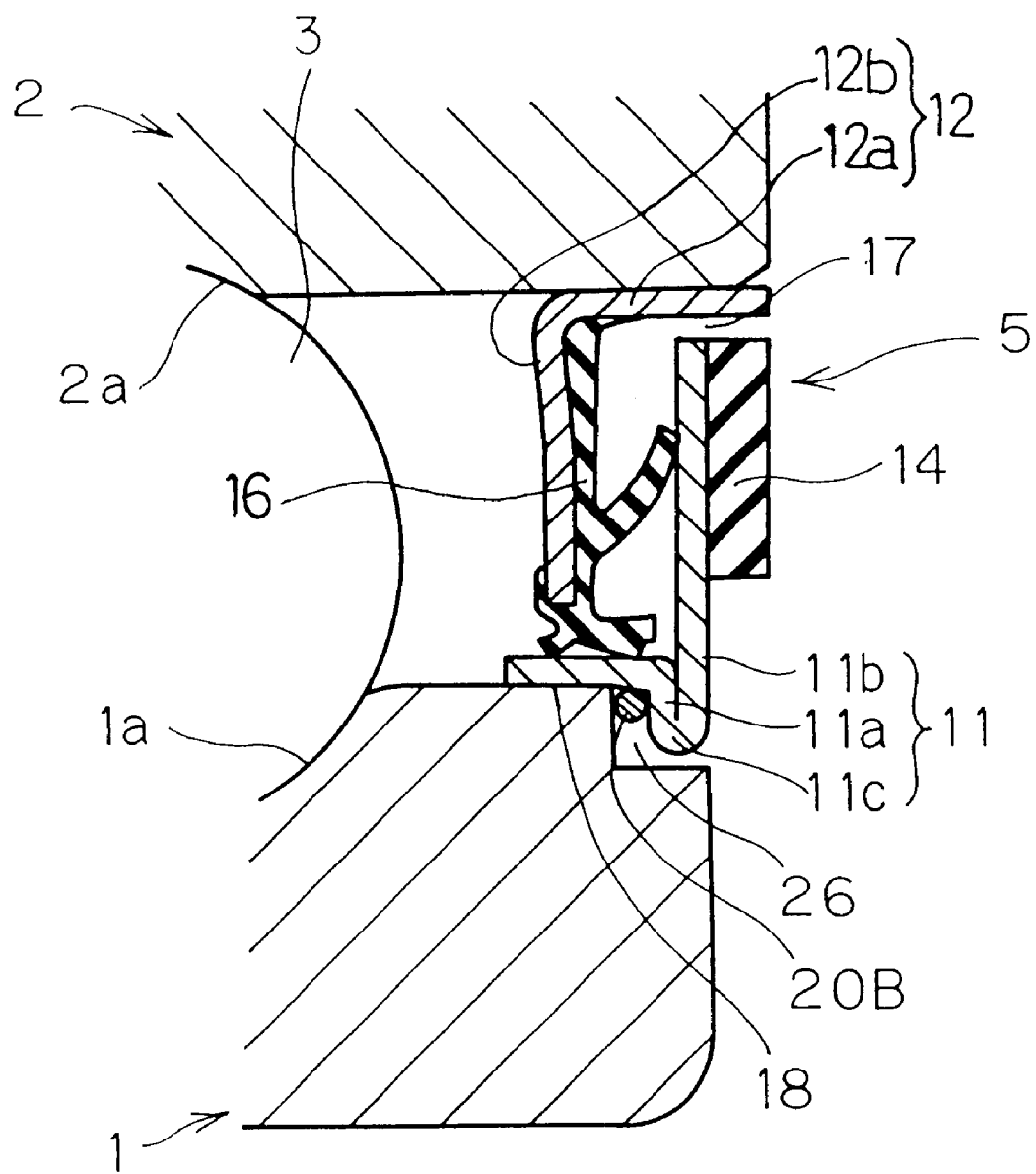
FIG. 8 is a fragmentary sectional view of the wheel bearing according to a fifth preferred embodiment in the first aspect of the present invention.

In an embodiment shown in FIG. 8, instead of the use of the thin film elastic member 20 shown in FIG. 1, the structure which will now be described is employed. Specifically, a joint between the cylindrical wall 11a and the radial wall 11b of the first annular sealing plate 11 is provided with a folded portion 11c that extends radially inwardly from the radial wall 11b and joined to the cylindrical wall 11a after having been turned backwards. This folded portion 11c is formed during the formation of the first annular sealing plate 11 by the use of any known press work.

On the other hand, an outer peripheral edge of the inner member 1 is radially inwardly depressed to provide an annular shoulder 26 of an undersized outer diameter. The first annular sealing plate 11 is so mounted and so positioned on the outer peripheral surface of the inner member 1 with the cylindrical wall 11a resting on the inner member 1 and with the folded portion 11c positioned within the annular shoulder 26. An ring-shaped elastic member 20B made of rubber material is interposed between a side wall portion of the annular shoulder 26 and the folded portion 11c. The ring-shaped elastic member 20B may be an O-ring or a shaft seal having one or more sealing lips.

It will readily be seen that when the first annular sealing plate 11 having the folded portion 11c is press-fitted around the inner member 1 with the folded portion 11c positioned within the annular shoulder 26, a passage for the flow of water becomes tortuous and, therefore, an external water will hardly ingress into the interior of the bearing. Also, the intervention of the ring-shaped elastic member 20B made of rubber material between the folded portion 11c and the side wall of the annular shoulder 26 is effective to secure a fluid tightness. In addition, the provision of the folded portion 11c in the first annular sealing plate 11 is effective to increase the rigidity of the first annular seating plate 11 itself and the press work to form the first annular sealing plate 11 can be performed with little elastic region (spring back) of the material left therein, and any possible deformation of the first annular sealing plate 11 which would otherwise occur when heated to an elevated temperature during a subsequent heat treatment and/or vulcanization of the rubber material for the elastic member 14 can advantageously be avoided. For this reason, the shape precision of the first annular sealing plate 11 can be increased and the sealability due to engagement can further be increased.

Figure 9:
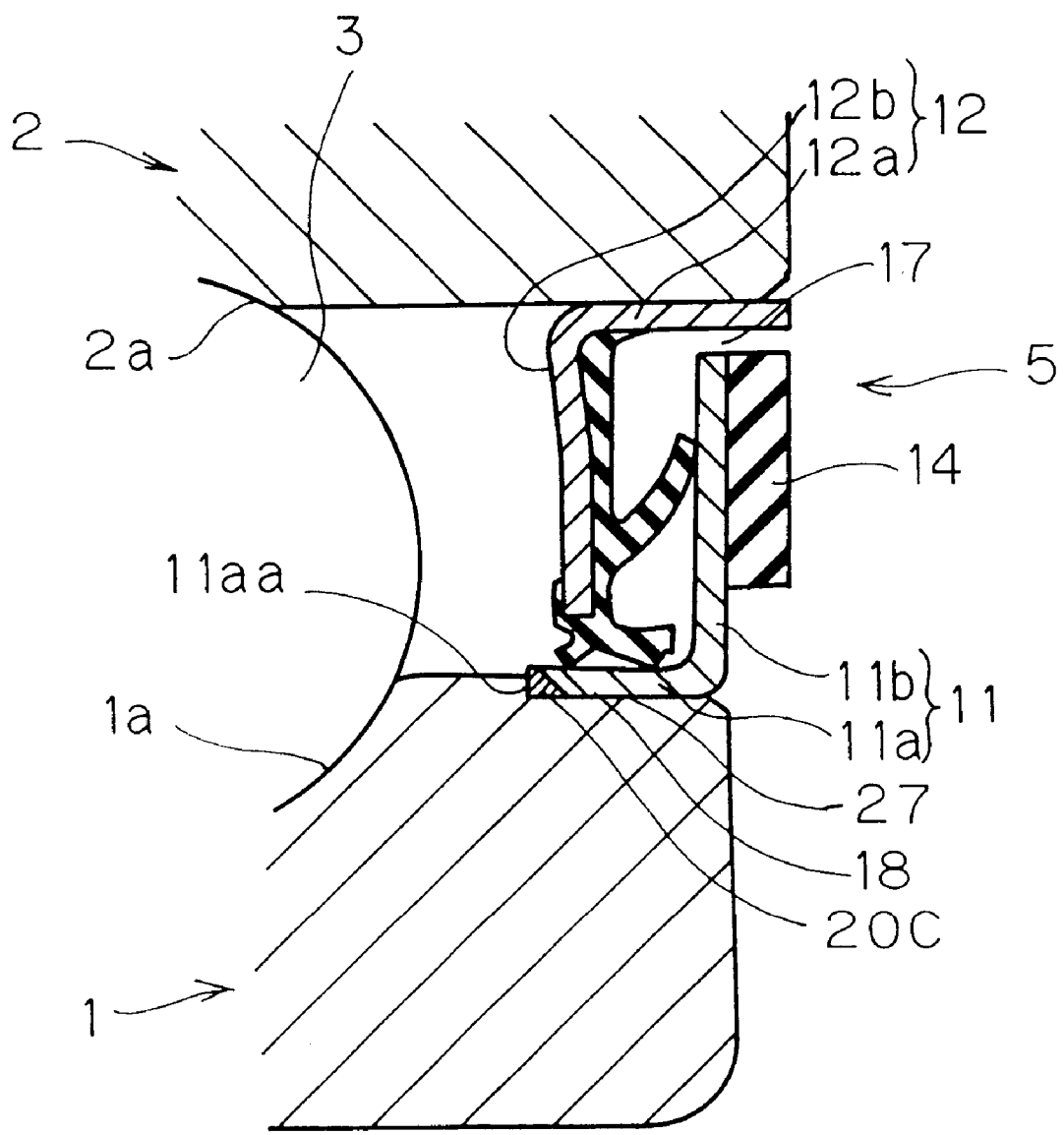
FIG. 9 is a fragmentary sectional view of the wheel bearing according to a sixth preferred embodiment in the first aspect of the present invention.

An embodiment shown in FIG. 9 is also similar to the embodiment shown in FIG. 1, but instead of the use of the elastic member 20 in the form of a thin film, the structure which will now be described is employed. An outer peripheral edge of the inner member 11 is radially inwardly depressed to provide a generally L-sectioned annular depression 27. The cylindrical wall 11a of the first annular sealing plate 11 is mounted on a portion of the outer peripheral surface of the inner member 1 that defines the bottom of the annular depression 27. A ring-shaped elastic member 20C made of rubber material is mounted on that portion of the outer peripheral surface of the inner member 1 and interposed between an annular radial side face of the depression 27 and an axial free end 11aa of the cylindrical wall 11a of the first annular sealing plate. The ring-shaped elastic member 20C is employed in the form of an O-ring. The annular depression 27 has a radial depth about equal to or smaller than the thickness of the wall forming the cylindrical wall 11a. The axial free end 11aa of the cylindrical wall 11a is chamfered to provide an annular slant face that is inclined radially downwardly towards the inner member 1.

It will readily be seen that when the annular elastic member 20C made of rubber material is elastically urged towards the annular radial side face of the depression 27, external water and/or dusts even when ingressing across the engagement surface 18 can be prevented by the ring-shaped elastic member 20C from further ingressing into 11aa the interior of the bearing. The provision of he annular slant face at the axial free end of the cylindrical wall 11a of the first annular sealing plate 11 is effective not only to facilitate insertion of the first annular sealing plate 11, but also to allow the ring-shaped elastic member 20c to deform elastically in a direction radially inwardly thereof, thereby minimizing any possible separation thereof while serving as a packing. Also, since a major portion of the cylindrical wall 11a of the first annular sealing plate 11 is held in direct contact with the inner member 1, prevention of any possible separation and/or axial displacement of the first annular sealing plate 11 can be maximized.

Figure 10:
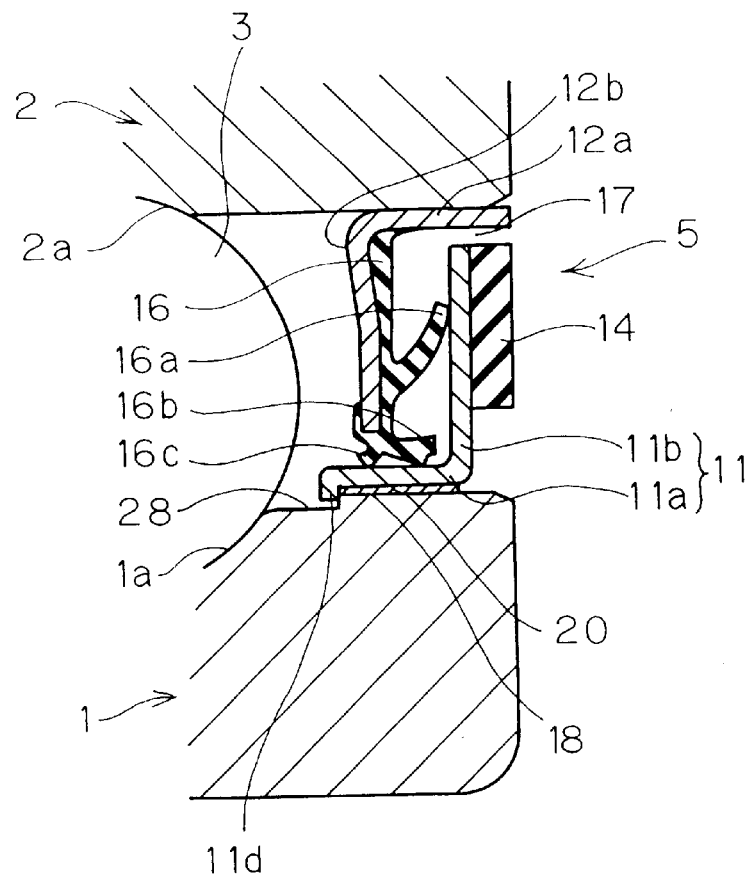
FIG. 10 a fragmentary sectional view of the wheel bearing according to a seventh preferred embodiment in the first aspect of the present invention.
Figure 11:
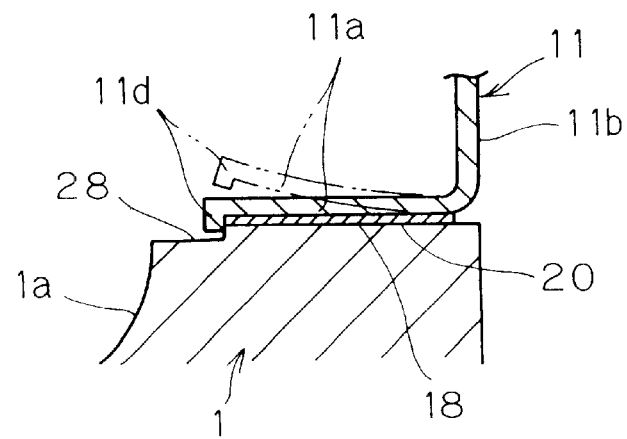
FIG. 11 is an explanatory diagram showing the manner of assembling the first annular sealing plate used therein.

An embodiment shown in FIGS. 10 and 11 is similar to the embodiment shown in FIG. 1, but differs therefrom in that the following structure is added to the sealing device employed in the embodiment of FIG. 1. Specifically, an axial free end of the cylindrical wall 11a of the first annular sealing plate 11 is bent to protrude radially inwardly to provide an annular stop pawl 11d which is, when the first annular sealing plate 11 is mounted on the inner member 1, engaged in an annular depression 28 that is defined in a portion of the outer peripheral surface of the inner member 1 adjacent the associated raceway 1a. The radially inwardly extending annular stop pawl 11d is defined by a radial bent of the axial free end of the cylindrical wall 11a whereas the annular depression 28 has a bottom face continued at one end to the raceway 1a.

By allowing the annular stop pawl 11d to engage in the annular depression 28, any possible axial displacement of the first annular sealing plate 11 can be avoided. It is, however, to be noted that when the first annular sealing plate 11 is to be mounted on the inner member 1, the axial free end portion of the cylindrical wall 11a is radially outwardly deformed against its own resiliency as shown by the phantom line in FIG. 11 and is then mounted on the inner member 1 under interference fit until the annular stop pawl 11d is brought to a position immediately above the annular depression 28, after which the first annular sealing plate 11 is allowed to restore to the original shape by the action of its own resiliency. By so doing, the annular stop pawl 11d can be brought into engagement in the annular depression 28.

Figure 12:
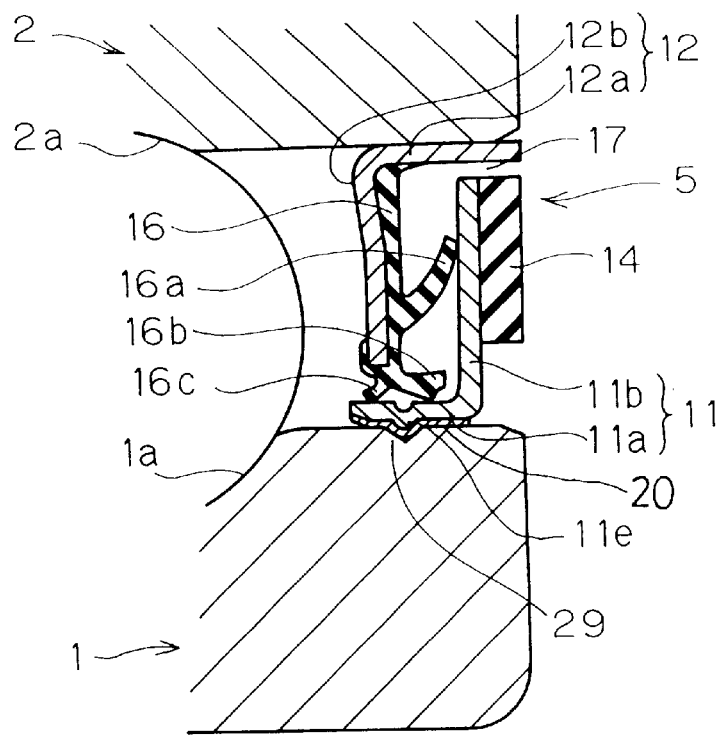
FIG. 12 is a fragmentary sectional view of the wheel bearing according to an eighth preferred embodiment in the first aspect of the present invention.
Figure 13:
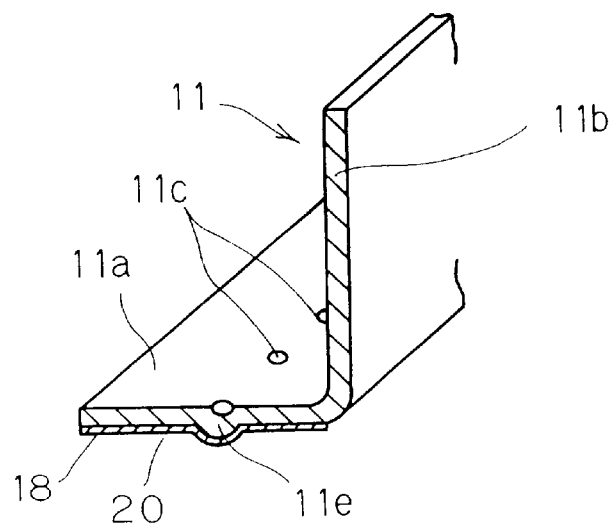
FIG. 13 is a fragmentary perspective view of the first annular sealing plate used therein.

An embodiment shown in FIGS. 12 and 13 is similar to the embodiment shown in FIG. 1, but differs therefrom in that the following structure is added to the sealing device employed in the embodiment of FIG. 1. Specifically, the cylindrical wall 11a of the first annular sealing plate 11 is formed with a projecting retainer means 11e so as to protrude radially inwardly of the bearing, which projecting retainer means is, when the first annular sealing plate 11 is mounted on the inner member 1, engaged in an annular groove 29 defined in the outer peripheral surface of the inner member 1. The projecting retainer means 11e is comprised of a circular row of a plurality of retainer projections formed at a generally intermediate portion of the cylindrical wall 11a of the first annular sealing plate 11 so in a fashion spaced a distance from each other in a direction circumferentially of the cylindrical wall 11a. The annular groove 29 is of a generally V-shaped section and formed on the outer peripheral surface of the inner member 1 at a location generally intermediate between the raceway 1a and the adjacent end face of the first member 1. The number of the retainer projections 11e forming the projecting retainer means 11e is preferably at least three and is preferably spaced an equal distance from each other in the circumferential direction of the inner member 1. Also, each of the retainer projections forming the projecting retainer means 11e may be of a rounded shape, a triangular shape or of a shape resulting from lancing.

Even when the first annular sealing plate 11 is mounted on the first member 1 with the retainer projections of the projecting retainer means 11e engaged in the annular groove 29, any possible axial displacement of the first annular sealing plate 11 can advantageously be avoided.

Figure 14:
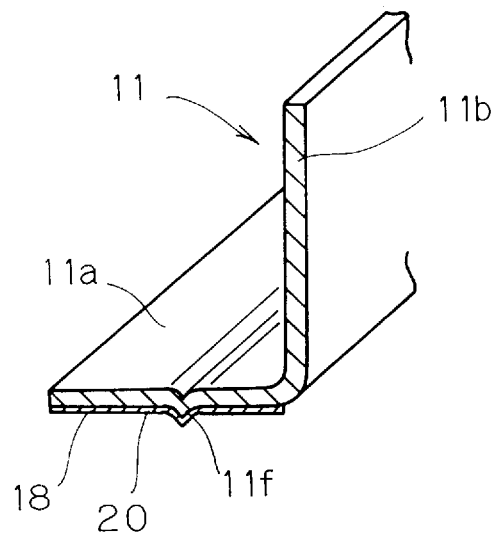
FIG. 14 is a fragmentary perspective view of a modified form of the first annular sealing plate used therein.

It is to be noted that instead of the projecting retainer means 11e comprised of the plurality of the retainer projections, the projecting retainer means may be in the form of an annular stop member 11f in the form of an annular projection formed on at a generally intermediate portion of the cylindrical wall 11a of the first annular sealing plate 11 so as to extend in a direction circumferentially of the cylindrical wall 11a as shown in FIG. 14, so that when the first annular sealing plate 11 is mounted on the inner member 1, the annular stop member 11f can engage in the annular groove 29 defined in the outer peripheral surface of the first member 1.

It is also to be noted that where the elements 11d, 11e and 11f are employed as is the case with the embodiments shown in FIGS. 10 to 14, respectively, the elastic member 20 may be in the form of a thin film or a ring-shaped rubber member such as described in connection with the embodiment shown in FIG. 1.

Respective embodiments shown in FIGS. 15 to 20 are those according to the second aspect of the present invention.

Figure 15:
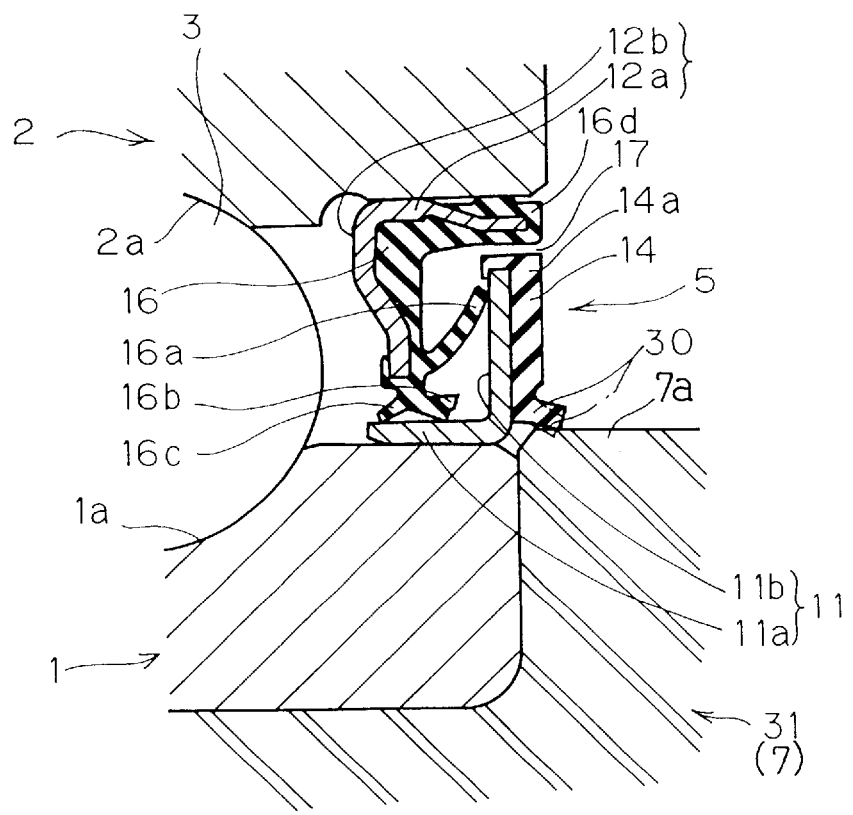
FIG. 15 is a fragmentary sectional view of the wheel bearing according to a first preferred embodiment in the second aspect of the present invention.

The embodiment shown in FIG. 15 is, except for what will now be described below, similar to the embodiment shown in FIG. 1. According to the embodiment shown in FIG. 15, instead of the use of the elastic member 20 employed in the first annular sealing plate 11 shown in FIG. 1, the elastic member 14 forming the encoder grid has an elastic tongue 30 protruding outwardly therefrom is elastically held in contact with a connecting member 31 that is held in abutment with the annular end face of the inner member 1. The elastic tongue 30 is of a shape in a natural state as shown by the chain line therein when it is not elastically deformed.

The connecting member 31 may be, for example, a constant speed universal coupling 7 having an annular shoulder 7a adapted to be held in abutment with the annular end face of the inner member 1 as shown in the example of FIG. 3. As shown therein, the elastic tongue 30 (FIG. 15) integral with the elastic member 14 is held in engagement with an outer peripheral face of the annular shoulder 7a of the constant speed universal coupling 7. Although in the example shown in FIG. 15, the constant speed universal coupling 7 is shown as engaging a portion of the inner peripheral surface of the inner member 1, the constant speed universal coupling 7 may be engaged with an inner peripheral surface of the barrel hub 6 where as is the case with the example shown in FIG. 3 the inner member 1 is constituted by the separate inner race 1A mounted externally on one end of the barrel hub 6.

The elastic tongue 30 protruding outwardly from the elastic member 14 extends slantwise in a direction axially of the bearing from an inner peripheral edge of the elastic member 14 over the entire circumference thereof and has a thickness smaller than the body of the elastic member 14 forming the encoder grid. The elastic tongue 30 may be made of the same material as that for the elastic member 14 and, where the same material as that for the elastic member 14 is employed for the elastic tongue 30, bonding by vulcanization to the first annular sealing plate 11 can be performed simultaneously with that of the elastic member 14 to the radial wall 11b of the first annular sealing plate 11, resulting in an advantage in terms of cost.

Although the elastic member 14 is shown to be of a configuration having an overhang portion 14a covering a radial outer circumferential portion of the radial wall 11b of the first annular sealing plate 11 in a generally capped fashion from an outer surface to an inner surface of the free end thereof, this overhang portion 14a may be dispensed with if so desired.

The elastic member 16 integrated together with the second annular sealing plate 12 is shown to be of a configuration having an overhang portion 16d covering an axial free end of the cylindrical wall 12a of the second annular sealing plate 12 in a generally capped fashion from an inner surface to an outer surface thereof, this overhang portion 16 may be dispensed with if so desired.

In the example shown in FIG. 15, the overhang portion 14a of the elastic member 14 provided on the first annular sealing plate 11 and the overhang portion 16d of the elastic member 16 provided on the second annular sealing plate 12 cooperate to define a radial gap which forms a labyrinth seal 17.

It is to be noted that although in the example shown in FIG. 15, the radial wall 12b of the second annular sealing plate 12 is shown as configured to represent a generally S-shape, the radial wall 12b may be flat as is the case with that in the example shown in FIG. 1.

In the embodiment shown in FIG. 15, since the elastic tongue 30 protruding from the elastic member 14 is elastically held in contact with the outer peripheral surface of the connecting member 31, any possible ingress of water and/or dusts into the interior of the bearing can advantageously be avoided. Also, since the first annular sealing plate 11 is directly engaged with the inner member 1, a sufficient force of engagement can be secured.

Figure 16:
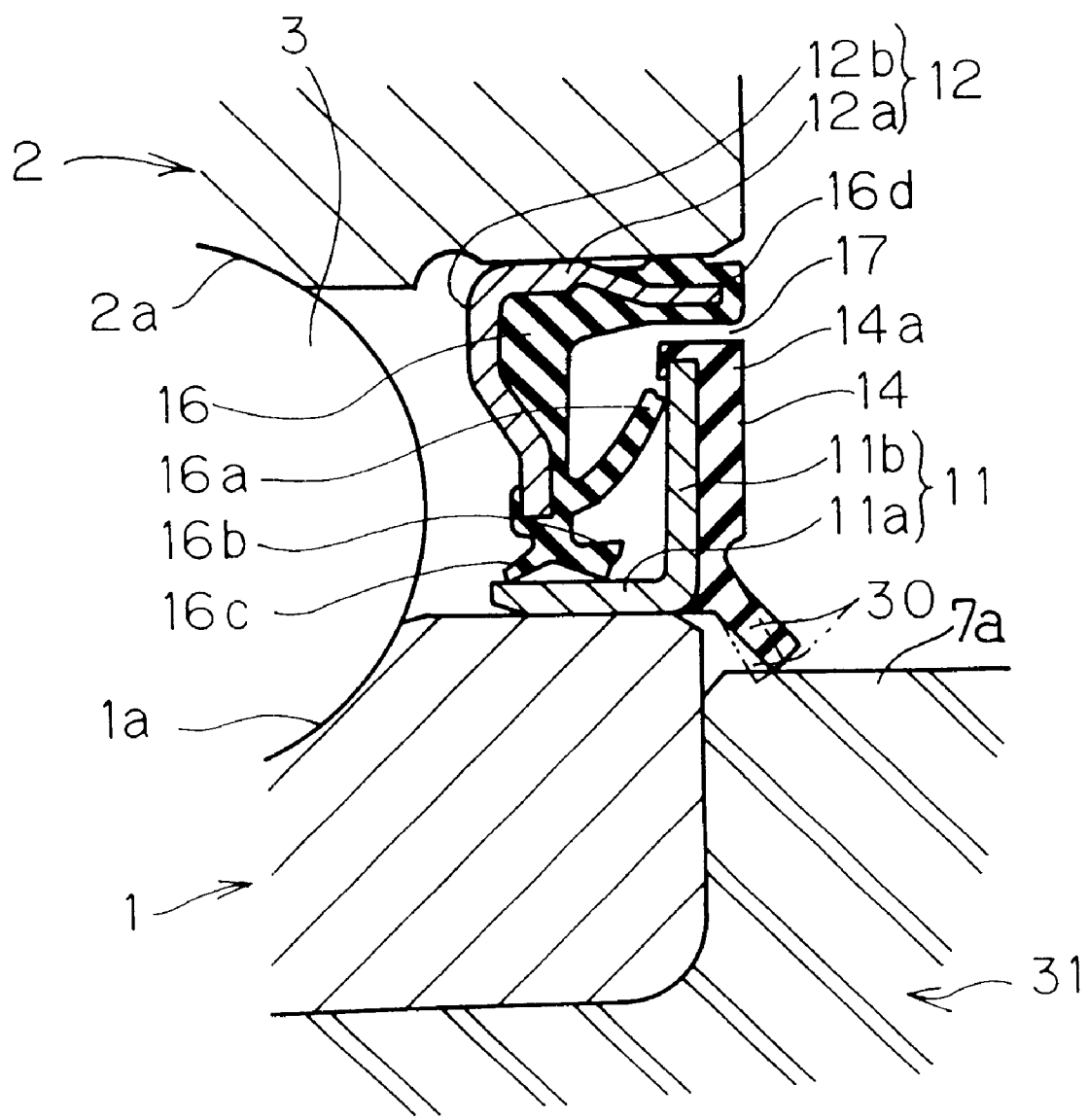
FIG. 16 is a fragmentary sectional view of the wheel bearing according to a second preferred embodiment in the second aspect of the present invention.

It is to be noted that the example of FIG. 15 is such that the annular shoulder of the connecting member 31 with which the inner member 1 is connected is of a relatively great diameter. Where the diameter of the annular shoulder of the connecting member 31 is relatively small, the tongue 30 should have a relatively great length as shown in FIG. 16.

Figure 17:
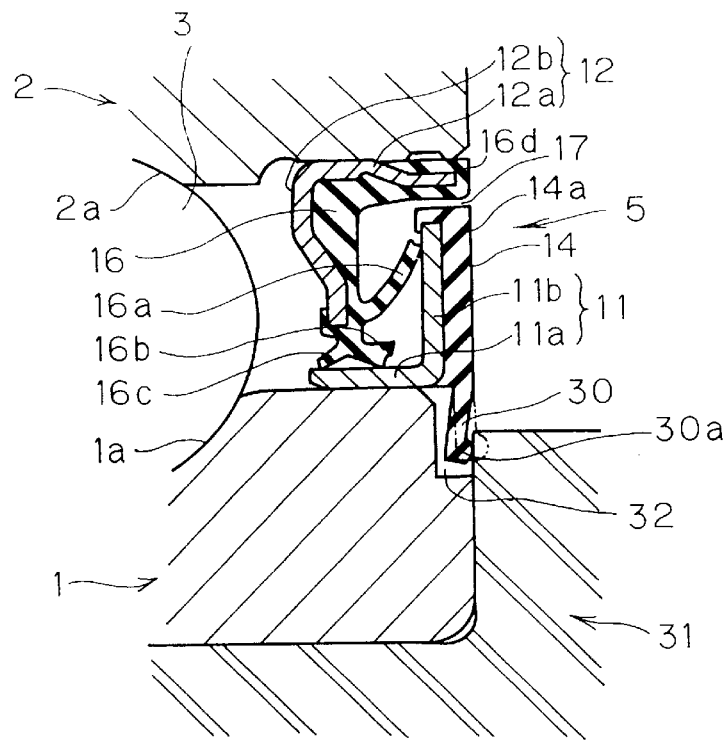
FIG. 17 is a fragmentary sectional view of the wheel bearing according to a third preferred embodiment in the second aspect of the present invention.

In an embodiment shown in FIG. 17, the outer peripheral edge of the inner member 1 is radially inwardly depressed to provide a generally L-sectioned annular depression 32 for accommodating the elastic tongue 30 that protrudes from the elastic member 14 so as to elastically engage an annular side face of the connecting member 31. The elastic tongue 30 has an annular lateral protuberance 30a at an inner peripheral portion thereof, said annular lateral protuberance 30a protruding towards the annular side face of the connecting member 31 for engagement with an annular side face of the shoulder of the connecting member 31.

With the structure shown in FIG. 17, since the annular lateral protuberance 30 is brought into engagement with the annular side face of the connecting member 31, the sealing device 5 including the elastic tongue 30 can be standardized without being adversely affected by the dimension of the outer peripheral surface of the shoulder of the connecting member 31.

Other structural features of the sealing device 5 employed in the embodiment shown in FIG. 17 are substantially similar to those employed in the embodiment shown in FIG. 15.

Figure 18:
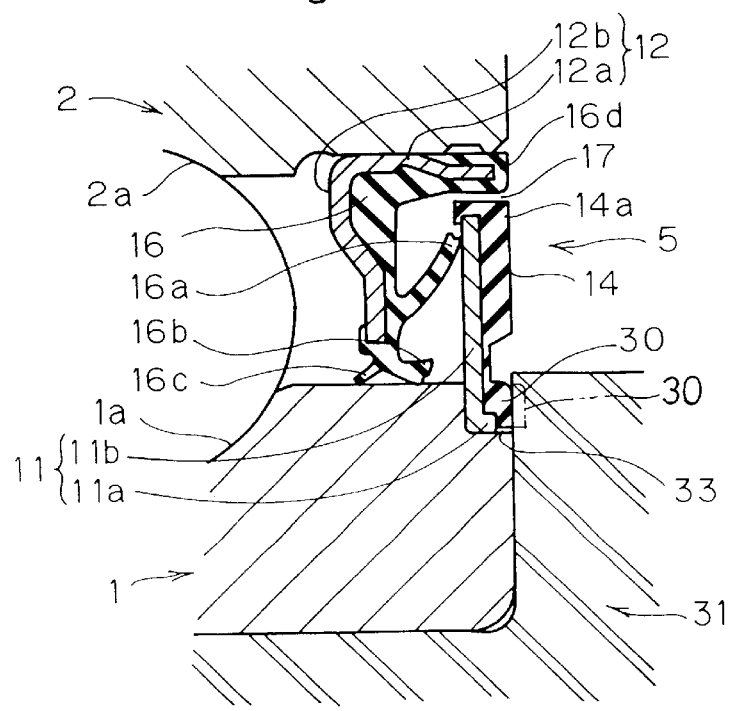
FIG. 18 is a fragmentary sectional view of the wheel bearing according to a fourth preferred embodiment in the second aspect of the present invention.

In an embodiment shown in FIG. 18, the outer peripheral edge of the inner member 1 is radially inwardly depressed to provide a generally L-sectioned annular depression 33 for accommodating the cylindrical wall 11a of the first annular sealing plate 11. Specifically, the first annular sealing plate 11 is mounted on the first member 1 with the cylindrical wall 11a thereof press-fitted to a bottom face of the annular depression 33 which is a part of the outer peripheral surface of the inner member 1 that is radially inwardly depressed. The cylindrical wall 11a of the first annular sealing plate 11 employed in this embodiment of FIG. 18 is relatively short having a length somewhat greater than the wall thickness thereof The radial wall 11b of the first annular sealing plate 11 is then held partially in contact with an annular side face of the annular depression 33. The elastic radial sealing lips 16b and 16c carried by the second annular sealing plate 12 are held in sliding contact with the outer peripheral surface of the inner member 1. The elastic tongue 30 protruding from the elastic member 14 forming the encoder grid is elastically engaged with an annular side face of the shoulder of the connecting member 31 within the annular depression 33. In such case, the elastic tongue 30 has a thickness in a natural state which is greater than the size of a gap between the radial wall 11b and the annular side face of the shoulder of the connecting member 31 as shown by the phantom line in FIG. 18, but is, in an assembled condition, compressed inwardly in contact with the annular side face of the connecting member 31.

With the structure shown in FIG. 18, since the elastic radial sealing lips 16b and 16c carried by the second annular sealing plate 12 are held in direct contact with the inner member, the sealability can be increased. Also, since the elastic tongue 30 is held in contact with and is therefore inwardly compressed in contact with the annular side face of the shoulder of the connecting member 31, the sealability can further be increased.

Where the annular depression 33 for accommodating the cylindrical wall 11a of the first annular sealing plate 11 is employed in the first member 1, the first annular sealing plate 11 may be prepared from, and be of a configuration representing, an annular plate having an inner bore through which the first annular sealing plate 11 can be press-fitted. However, the annular plate as formed by a blanking technique would not provide a sufficient accuracy and a sufficient binding force and, therefore, difficulty will arise in alignment of the encoder grid with the elastic member 14 in view of the squareness of the radial wall 11b. However, the use of the cylindrical wall 11a of a relatively small axial length is effective to secure the binding force and to accomplish the highly accurate alignment.

Other structural features of the sealing device 5 employed in the embodiment shown in FIG. 18 are substantially similar to those employed in the embodiment shown in FIG. 15.

Figure 19:
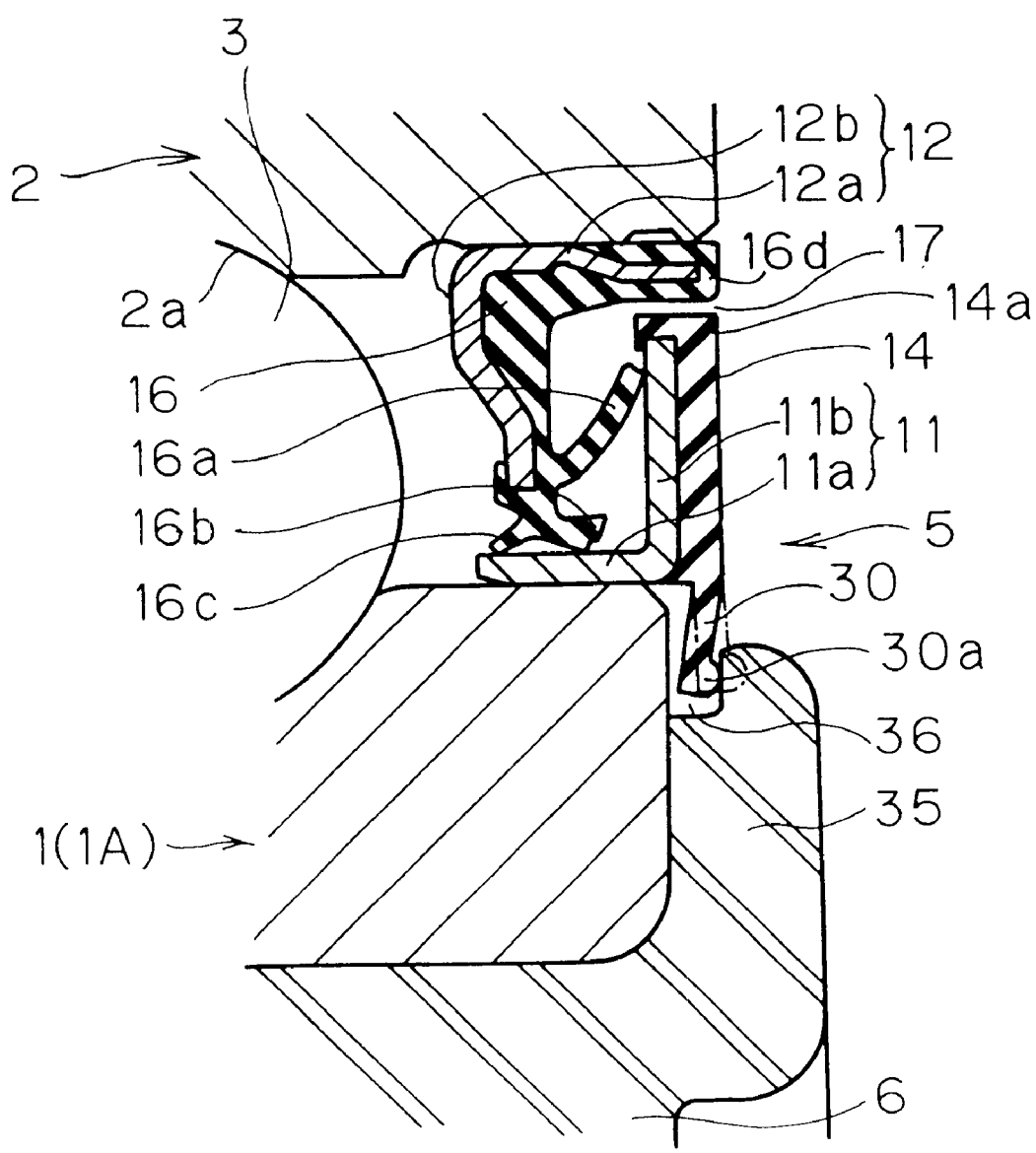
FIG. 19 is a fragmentary sectional view of the wheel bearing according to a fifth preferred embodiment in the second aspect of the present invention.

According to an embodiment shown in FIG. 19, the elastic tongue 30 protruding from the elastic member 14 is elastically engaged with a connecting member 35 then held in abutment with an annular end face of the inner member 1. In this embodiment, the connecting member 35 is defined by a crimped portion of the barrel hub 6 which is crimped radially outwardly to confront the axial end of the separate inner race 1A then held in abutment with one end of the barrel hub 6. The separate inner race 1A serves as the inner member 1, and the barrel hub 6 and the separate inner race 1A are formed, for example, in a manner similar to those shown in the example of FIG. 3. In the example shown in FIG. 3, a crimp projection of a cylindrical configuration extending axially from the barrel hub 6 is formed and is, after the separate inner race 1A has been engaged, crimped radially outwardly in the form of a radial flange to retain the separate inner race 1A in position. The crimped portion representing the shape of a radial flange so formed constitute the connecting member 35. The elastic tongue 30 is adapted to be elastically held in contact with an outer peripheral surface of the connecting member 35 defined by the crimped portion.

In the structure according to the embodiment shown in FIG. 19, by the utilization of the connecting member 35 defined by the crimped portion, the sealability can be secured owing to the elastic contact of the elastic tongue 30 with no need to increase the size of the elastic tongue 30.

Other structural features of the sealing device 5 employed in the embodiment shown in FIG. 19 are substantially similar to those employed in the embodiment shown in FIG. 15.

Figure 20:
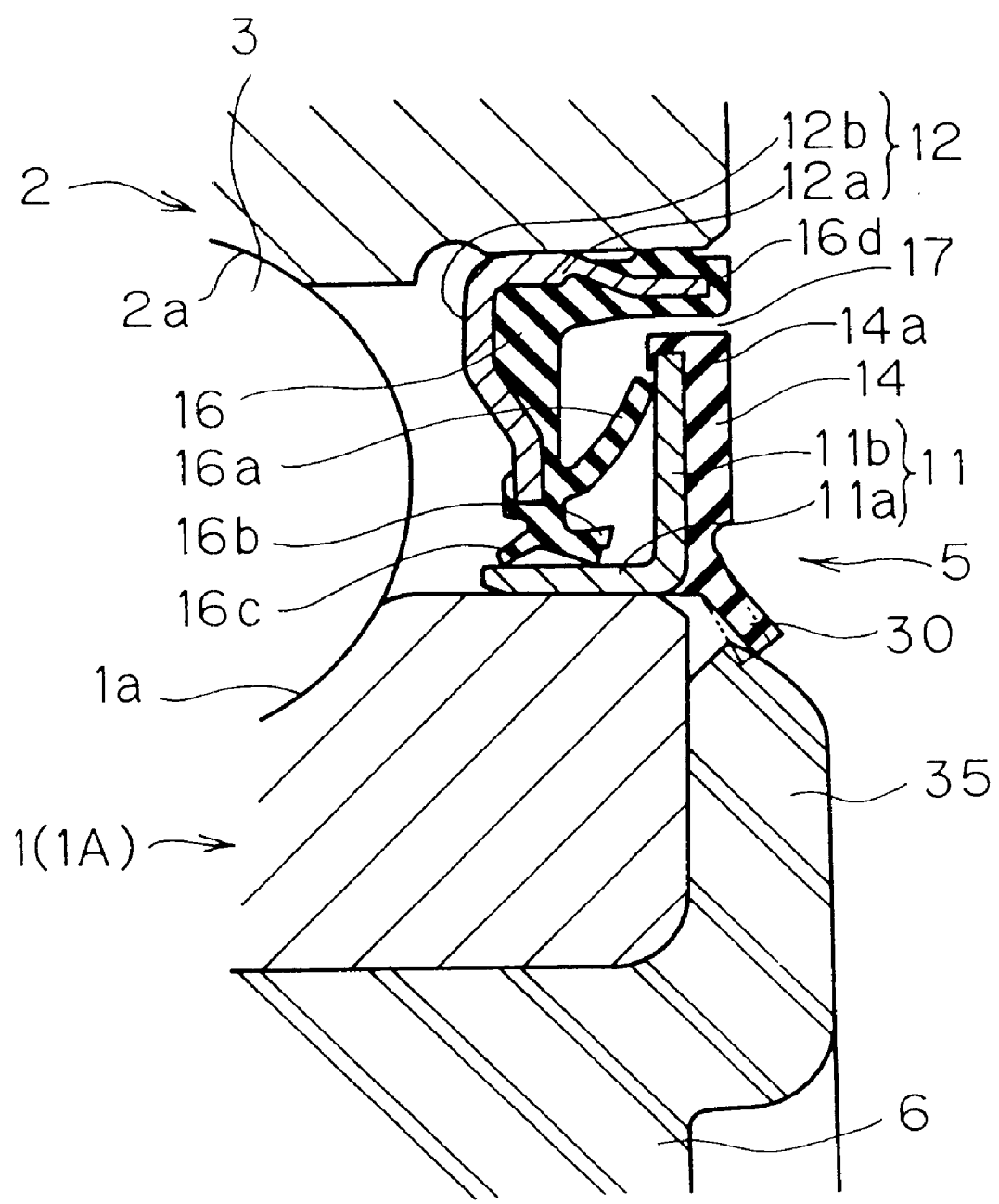
FIG. 20 is a fragmentary sectional view of a sealing device for the wheel bearing according to a sixth preferred embodiment in the second aspect of the present invention.

Instead of the elastic tongue 30 which is, in the embodiment shown in FIG. 19, engaged with the outer peripheral surface of the connecting member 35, the crimped portion of the connecting member 35 may be formed with a radially inwardly extending annular step 36 so that the elastic tongue 30 can be elastically engaged with an annular side face of the annular step 36 as shown in FIG. 20.

Figure 21A:
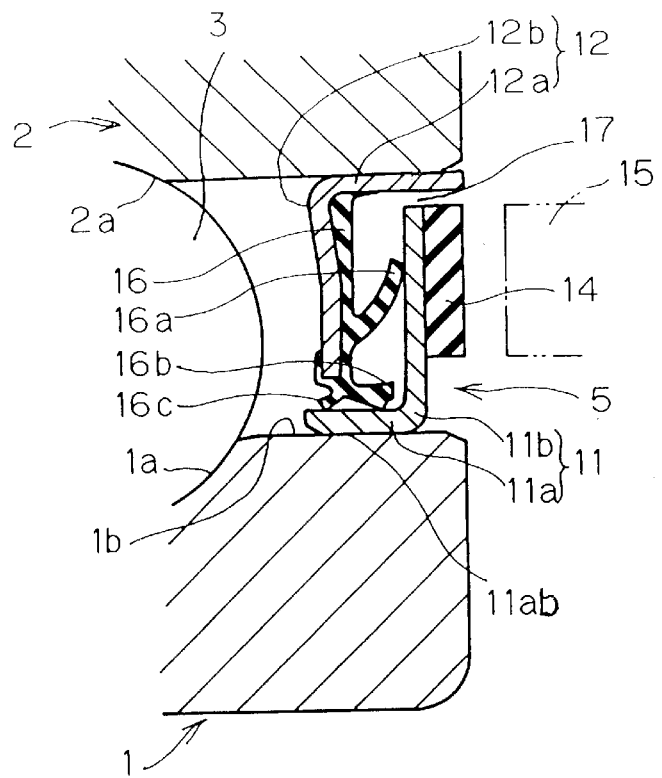
FIG. 21A is a fragmentary sectional view of the wheel bearing according to a preferred embodiment in the third aspect of the present invention.
Figure 21B:
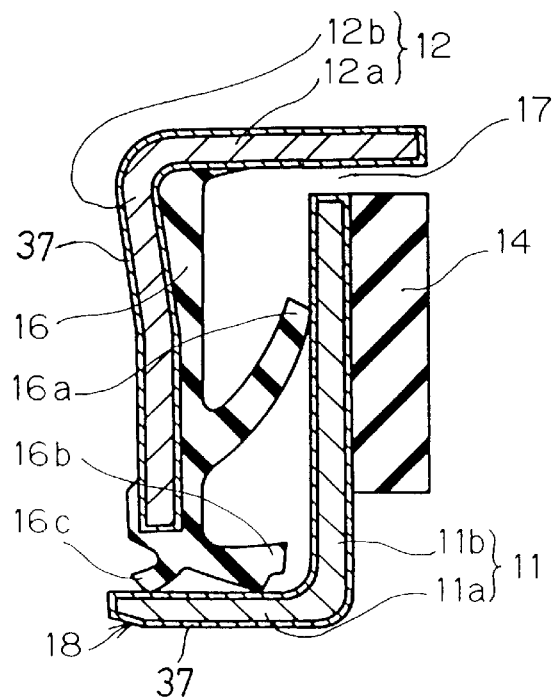
FIG. 21B is a sectional view, on an enlarged scale, showing the sealing device employed in the wheel bearing shown in FIG. 21A.
Figure 22:
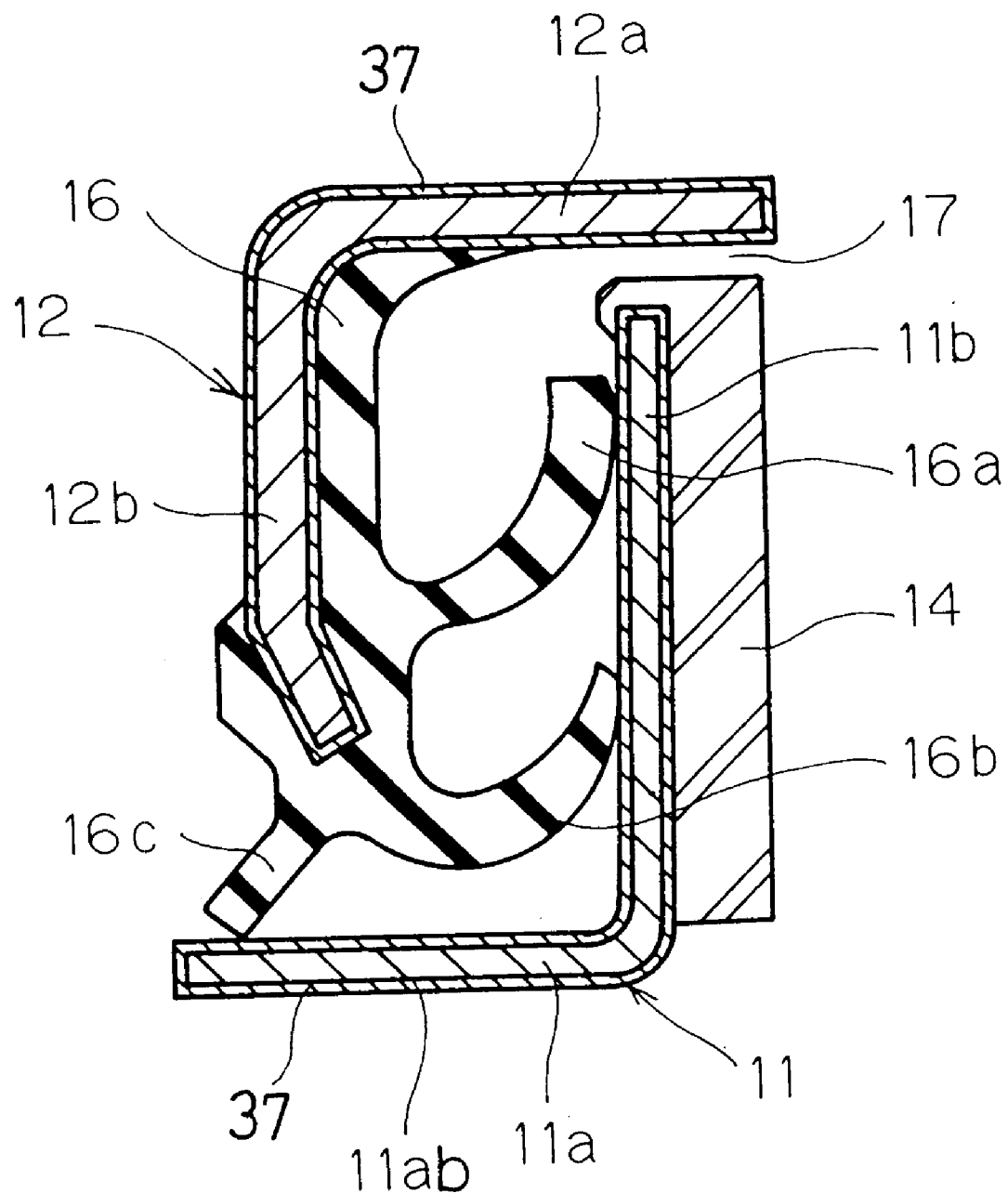
FIG. 22 is a sectional view showing a modified form of the sealing device according to the third aspect of the present invention.

Respective embodiments shown in FIGS. 21A and 21B and FIG. 22 pertains to those according to the third aspect of the present invention.

The embodiment shown in FIGS. 21A and 21B is, except for what will now be described below, similar to the embodiment shown in FIG. 1. According to the embodiment shown in FIGS. 21A and 21B, of the first and second annular sealing plates 11 and 12, at least the first annular sealing plate 11 is formed with a metallic layer 37 on a surface of a steel plate made of a magnetic material. The metallic layer 37 is made of a metal having a Young's modulus of elasticity which is lower than that of the inner member 1. In the example shown therein, both of the first and second annular sealing plates 11 and 12 are formed with the respective metallic layers 37. The metallic layer 37 is, for example, a metal plating. The inner member 1 is made of, for example, steel material such as bearing steel. The metal having the lower Young's modulus of elasticity may be chosen from the group consisting of zinc, tin, gold, silver and copper. The metallic layer 37 has a thickness within the range of 5 to 30 μm. In particular, where the metallic layer 37 is a metal plating, the thickness of the metallic layer 37 is preferred to be within this range.

Since the first annular sealing plate 11 is formed with the metallic layer 37, a magnetic material having a high physical strength, for example, a rolled steel plate (a cold rolled steel plate such as SPCC) or carbon tool steel such as, for example, SK5, or carbon steel plate such as, for example, S45C can be employed as a material for the first annular sealing plate 11, with no need to use an expensive stainless steel. Even though such a steep plate is employed as a material for the first annular sealing plate 11, a relatively high rust proof can be obtained since the first annular sealing plate 11 is covered by the metallic layer 37 having a rust proof property. The use of such an inexpensive steel plate is advantageous in terms of cost. Also, where the second annular sealing plate 12 is covered by the metallic layer 37, the rust proof can be increased and there is no need to select material highly resistant to rusting and an inexpensive material can be selected. It is, however, to be noted that the second annular sealing plate 12 is preferably prepared from a non-magnetic metal plate.

An engagement surface 1b of the inner member 1 on which the first annular sealing plate 11 is mounted is machined simultaneously with machining of the raceway 1a to thereby form a plunge cut surface. The engagement surface 1b has a surface roughness not greater than Rmax 3.0 or not greater than Ra 0.63 and is preferably within the range of Rmax 0.5 to 2.2. The surface roughness of a steel plate an engagement surface 11ab of the first annular sealing plate 11 that is held in contact with the inner member 1 is not greater than Rmax 3.0 or not greater than Ra 0.63 and is preferably within the range of Rmax 0.5 to 2.2.

Because of the surface roughness and the shape precision of the engagement surface 1b of the inner member 1, minute surface irregularities are formed at an engagement portion between the first annular sealing plate 11 and the inner member 1, and also similar minute surface irregularities are formed in the steel plate at the engagement surface 11ab of the first annular sealing plate 11. However, since the metallic layer 37 having the Young's modulus of elasticity lower than that of the inner member 1 is formed on the surface of the first annular sealing plate 11, detents of the minute surface irregularities are filled up by soft metal forming the metallic layer 37, resulting in increase of the sealability. Accordingly, any possible degradation of the grease which would otherwise result from ingress of water into the interior of the bearing can be prevented, resulting in increase of the lifetime of the bearing. Since the first annular sealing plate 11 makes use of the steel plate, the magnetic flux density of the encoder grid can be increased. Also, since the metallic layer on the surface of the steel plate is relatively thin, it will little affect the magnetic flux density.

In addition, since the first annular sealing plate is provided with the metallic layer 37, the first annular sealing plate 11 even when prepared from any of the various steel plates such as, for example, a rolled steel plate which is a magnetic material having a high physical strength, a sufficient rust proof can be obtained. For this reason, with no need to use an expensive stainless steel or the like, an advantage in terms of cost can be appreciated.

Where the thickness of the metallic layer 37 is chosen to be within the range of 5 to 30 $\mu$m, the minute surface irregularities resulting from the surface roughness of the engagement surface can be filled sufficiently and the flatness of the engagement surface can also be secured, resulting in reduction in cost. In other words, if the surface roughness of the engagement surface 1b of the inner member 1 on which the first annular sealing plate 11 is mounted is about Rmax 3.0 (or Ra 0.63), and in order for the resultant minute surface irregularities to be filled up, the thickness of the metallic layer has to be at least not smaller than 5 $\mu$m. On the other hand, even if this thickness is chosen to be not smaller than 30 $\mu$m, effects brought about thereby remain the same and, conversely, the evenness (or flatness) will be adversely affected, requiring an increased length of time to form the metallic layer 37 together with increase of the cost. For this reason, the thickness of the metallic layer 37 is preferred to be within the above mentioned range.

If the surface roughness of the engagement surface 11ab of the first annular sealing plate 11 is chosen to be not greater than Rmax 3.0, particularly within the range of Rmax 0.5 to 2.2, the effect of the metallic layer 37 to fill up the minute surface irregularities resulting from the surface roughness can be increased.

If the engagement surface 1b of the inner member 1 is machined to define the plunge cut surface, the raceway 1a and the engagement surface 1b can be simultaneously formed by machining and any possible misalignment therebetween can be prevented. In the case of the plunge cut surface, machining to form the engagement surface 1b having the surface roughness not greater than Rmax 3.0 can easily be performed and, by increasing of the surface evenness in this way, the sealability can further be increased.

It is to be noted that in the foregoing embodiments the use has been made of the elastic side sealing lip 16a and the two elastic radial sealing lips 16c and 16b positioned on respective sides of the associated radial wall 12b with respect to the axial direction of the bearing as shown in FIG. 21. However, the axially outer elastic radial sealing lip 16b may be replaced with an elastic side sealing lip as shown in FIG. 22 or may be dispensed with if so desired.

Respective embodiments shown in FIGS. 23 to 29 pertains to those according to the fourth aspect of the present invention.

Figure 23:
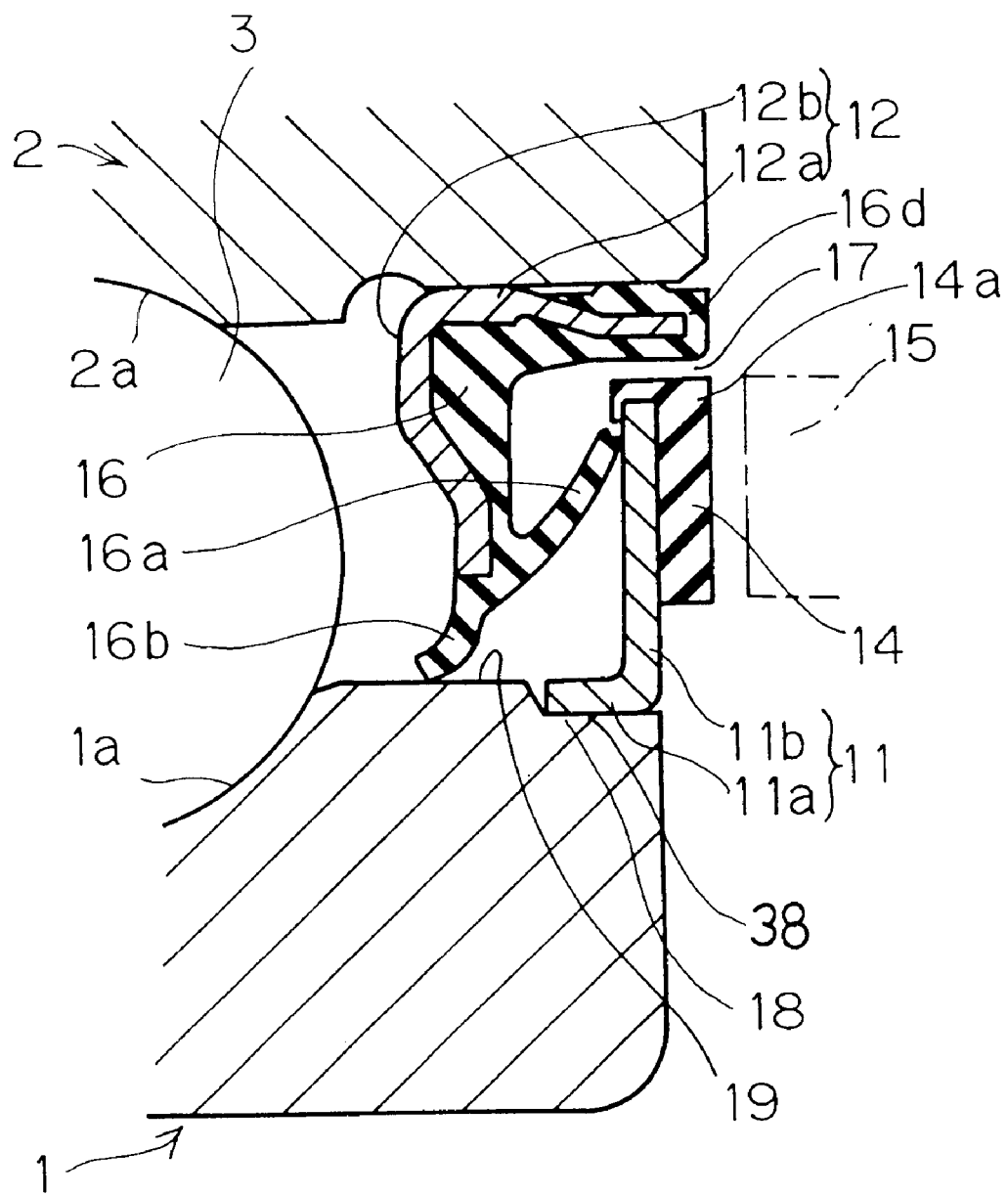
FIG. 23 is a fragmentary sectional view of the wheel bearing according to a first preferred embodiment in the fourth aspect of the present invention.

The embodiment shown in FIG. 23 is, except for what will now be described below, similar to the embodiment shown in FIG. 1. According to the embodiment shown in FIG. 23, the first annular sealing plate 11 has its cylindrical wall 11a engaged with an outer peripheral surface of a radially inwardly extending annular depression 38 formed on the outer peripheral surface of the inner member 1. The annular depression 38 has a depth corresponding to the thickness of the first annular sealing plate 11 and defines a reduced outer diameter portion of the inner member 1. This annular depression 38 has an axial length so chosen as to allow the axial free end of the cylindrical wall 11a of the first annular sealing plate to engage an annular side wall of the annular depression 38. By way of example, the axial length of the annular depression 38 is about equal to the axial length of the cylindrical wall 11a.

The second annular sealing plate 12 is integrated together with the elastic side sealing lip 16a, slidingly engageable with the radial wall 11b of the first annular sealing plate 11, and the elastic radial sealing lip 16b slidingly engageable with an outer peripheral surface 19 of the inner member 1 adjacent the engagement surface 18, or the cylindrical wall 11a, of the first annular sealing plate 11. These elastic sealing lips 16a and 16b form respective parts of the elastic member 16 made of an elastomer and bonded by vulcanization to the second annular sealing plate 12. The elastic side sealing lip 16a has its free end portion inclined so as to extend towards a radial inner edge of the radial wall 11b of the first annular sealing plate 11 whereas the elastic radial sealing lip 16b has its free end portion inclined so as to extend towards the interior of the bearing.

The radial wall 12b of the second annular sealing plate 12 is bent to represent a generally S-shaped or Z-shaped configuration so that a base portion thereof adjacent the joint between the cylindrical wall 12a and the radial wall 12b can protrude towards the interior of the bearing beyond the free end portion of the radial wall 12b. This configuration permits the second annular sealing plate 12 to have an increased rigidity and also permits the elastic member 16 to be formed to have an increased wall thickness.

According to the wheel bearing of the structure shown in and described with reference to FIG. 23, the seal between the inner and outer members 1 and 2 can be created by the sliding engagement of the elastic sealing lips 16a and 16b provided in the second annular sealing plate 12 and the labyrinth seal 17 at the annular gap between the cylindrical wall 12a of the second annular sealing plate 12 and the outer peripheral edge of the radial wall 11b of the first annular sealing plate 11. The elastic radial sealing lip 16b is slidingly engaged with the outer peripheral surface adjacent the annular sealing plate engagement of the inner member 1 which is the rotary member and, therefore, even when water ingresses across the engagement 18 between the first annular sealing plate 11 and the inner member 1, further ingress of the water into the interior of the bearing can be prevented by the sliding engagement of the elastic radial sealing lip 16b. For this reason, there is no possibility of the grease being deteriorated in contact with water and the lifetime of the bearing can therefore be increased. Also, since the sealability can be secured by the elastic radial sealing lip 16b, the material for the first annular sealing plate 11 may not be limited and the use of a suitable ferromagnetic material makes it possible to increase the magnetic flux density of the encoder grid defined by the elastic member 14 provided on the radial wall 11b of the first annular sealing plate 11.

Also, since the inner member 1 is provided with the annular depression 38 and the first annular sealing plate 11 is mounted in the annular depression 38, any possible axial displacement of the first annular sealing plate towards the interior of the bearing can be avoided, the position where the first annular sealing plate 11 is arranged with respect to the axial direction is regulated and a proper play for the elastic side sealing lip 16a can be retained. Since the above described annular depression 38 has a depth corresponding to the wall thickness of the cylindrical wall 1 a of the first annular sealing plate 11, there is neither a problem associated with any possible reduction in strength of the inner member 1 resulting from the formation of the annular depression 38 and a problem associated with the increase in size of the first annular sealing plate 11, and any possible insufficient engagement due to the relatively small depth of the annular depression 38 can also be avoided.

Figure 24:
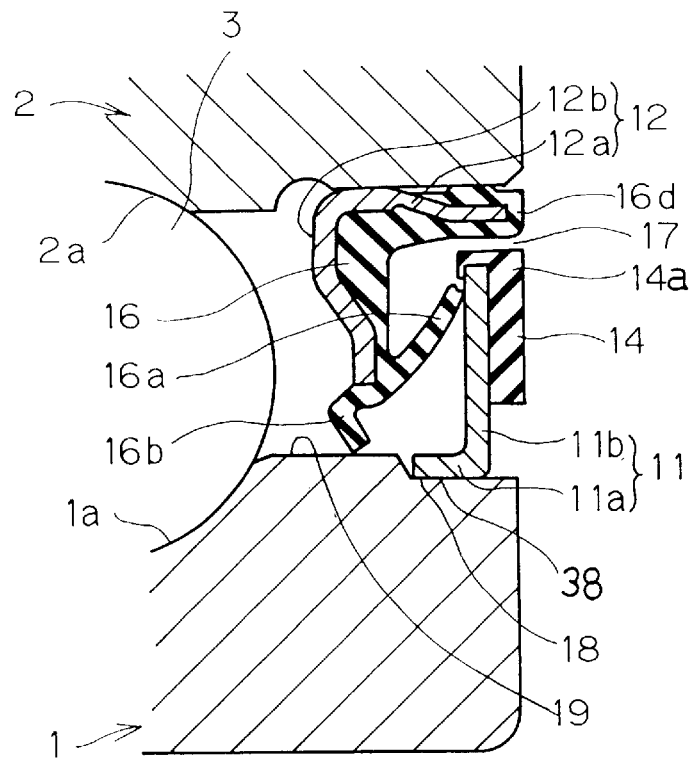
FIG. 24 is a fragmentary sectional view of the wheel bearing according to a second preferred embodiment in the fourth aspect of the present invention.

Another embodiment according to the fourth aspect of the present invention is shown in FIG. 24. This embodiment of FIG. 24 is substantially similar to that shown in FIG. 23, except that the elastic radial sealing lip 16b which has been described as having its free end portion inclined so as to extend towards the interior of the bearing in the previously described embodiment of FIG. 23 has its free end portion inclined in a direction axially outwardly of the bearing. Other structural features of the sealing device 5 employed in the embodiment shown in FIG. 24 are substantially similar to those employed in the embodiment shown in FIG. 23.

According to the embodiment shown in FIG. 24, if the free end portion of the elastic radial sealing lip 16b is inclined so as t extend axially outwardly of the bearing, the effect of preventing water from ingressing from the outside of the bearing into the interior of the bearing can be increased advantageously. For this reason, water ingressing across the engagement 18 and the elastic side sealing lip 16a from the outside of the bearing can be assuredly prevented from further ingressing into the interior of the bearing past the elastic radial sealing lip 16b.

Figure 25:
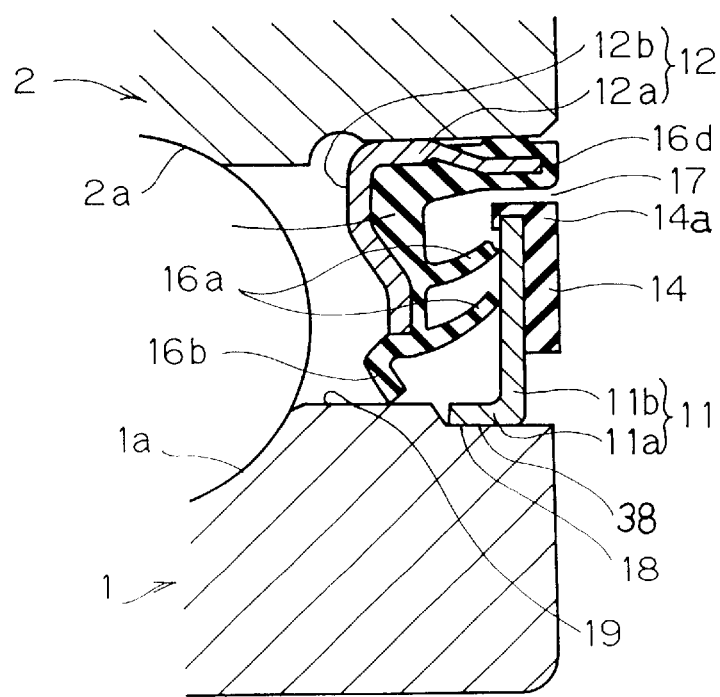
FIG. 25 is a fragmentary sectional view of the wheel bearing according to a third preferred embodiment in the fourth aspect of the present invention.

FIG. 25 illustrates a further embodiment according to the fourth aspect of the present invention. The embodiment of FIG. 25 is substantially similar to that shown in FIG. 24, except that in the embodiment of FIG. 25 the elastic side sealing lip 16a is formed at two location spaced a distance radially inwardly and outwardly. Other structural features of the sealing device 5 employed in the embodiment shown in FIG. 25 are substantially similar to those employed in the embodiment shown in FIG. 24.

The elastic side sealing lip 16a is effective to exhibit a primary function of preventing water from ingressing from the outside of the bearing into the interior of the bearing and, therefore, the provision of such elastic side sealing lip 16a at the radially inner and outer locations as described above, the function of preventing water from ingressing into the interior of the bearing can be enhanced.

Figure 26:
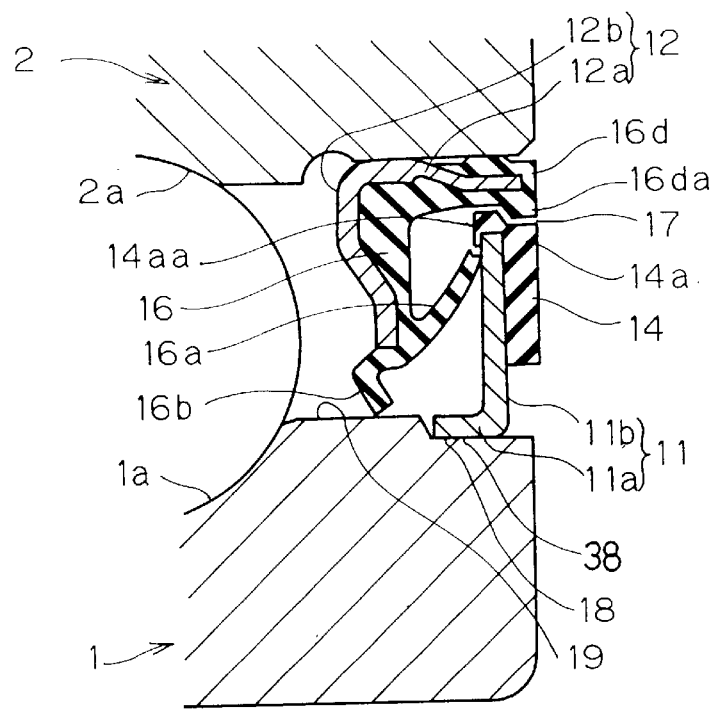
FIG. 26 is a fragmentary sectional view of the wheel bearing according to a fourth preferred embodiment in the fourth aspect of the present invention.

FIG. 26 illustrates a still further embodiment according to the fourth aspect of the present invention. In this embodiment, an outer peripheral face of the overhang portion 14a in the first annular sealing plate 11 is formed with a radially outwardly protruding annular protrusion 14aa on one side adjacent the interior of the bearing and, on the other hand, an inner peripheral face of the overhang portion 16d in the second annular sealing plate 12 is also formed with a radially inwardly protruding annular protrusion 16da. The radially outwardly and inwardly protruding annular protrusions 14aa and 16da define the maximum diameter portion at the free end of the radial wall 11b of the first annular sealing plate 11 and a minimum diameter portion at the axial end of the cylindrical wall 12a of the second annular sealing plate 12, respectively. The radially outwardly protruding annular projection 14aa is positioned inwardly of the bearing with respect to the radially inwardly protruding annular projection 16da and has its diameter of outer periphery greater than that of the inner periphery of the radially inwardly protruding annular projection 16da. Respective faces of the radially outwardly and inwardly protruding annular projections 14aa and 16da are formed as inclined faces substantial parallel to each other. Other structural features of the sealing device 5 employed in the embodiment shown in FIG. 26 are substantially similar to those employed in the embodiment shown in FIG. 25.

In the case of this structure, when the radially outwardly and inwardly protruding annular projections 14aa and 16da are engaged with each other in the axial direction, any possible separation between the first and second annular sealing plates 11 and 12 can be avoided during an assemblage thereof into the bearing. In other words, since with the basic structure the annular radial sealing lip 16b in the second annular sealing plate 12 is not in sliding contact with the outer peripheral surface 19 of the inner member 1, they are in a condition having not yet been assembled into the bearing and the first and second annular sealing plates 11 and 12 will be separated relative to each other. For this reason, transportation and an assemblage into the bearing are complicated, accompanied by increase in number of manufacturing steps. In contrast thereto, allowing the radially outwardly and inwardly protruding annular projections 14aa and 16da to be engaged with each other in the axial direction is effective to eliminate the possible separation between the first and second annular sealing plates 11 and 12 in a condition having not yet been assembled and they can be dealt with as a single component part. Accordingly, not only at the time of transportation, but the number of assembling steps into the bearing can be reduced, thereby facilitating the assemblage. Also, the provision of the radially outwardly and inwardly protruding annular projections 14aa and 16da allows the gap forming the labyrinth seal 17 to represent a generally tortuous shape, resulting in increase of the sealability. Also, since the radially outwardly and inwardly protruding annular projections 14aa and 16da are formed by utilizing respective portion of the associated elastic members 14 and 16, the first and second annular sealing plates can be forcibly separated or assembled by forcibly moving the first and second annular sealing plates 11 and 12 in the axial direction to deform the projections 14aa and 16da.

It is to be noted that in the embodiment shown in FIG. 26 the first and second annular sealing plates 11 and 12 have been shown as including the respective overhang portions 14a and 16d, with the radially outwardly and inwardly protruding annular projections 14aa and 16da formed thereon, respectively. However, one of the overhang portions 14a and 16d may be dispensed with if so desired.

Figure 27:
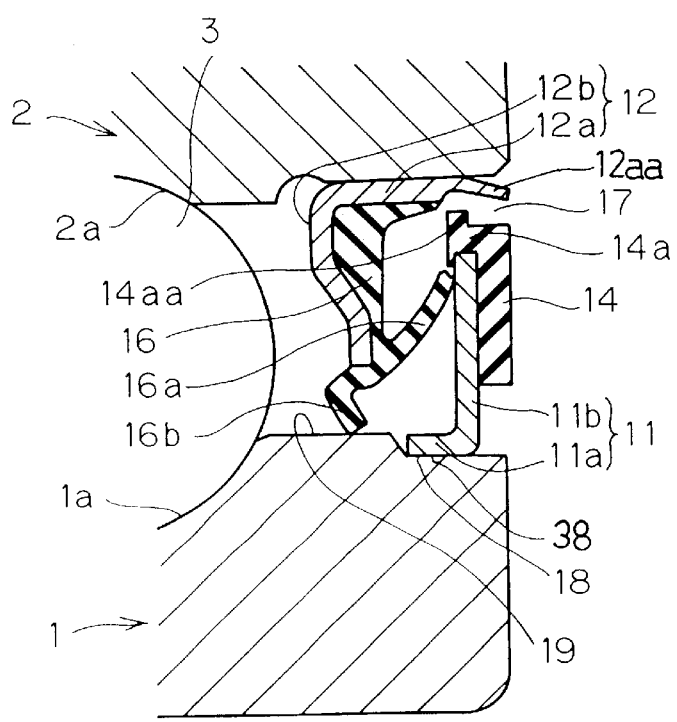
FIG. 27 is a fragmentary sectional view of the wheel bearing according to a fifth preferred embodiment in the fourth aspect of the present invention.

By way of example, as shown in FIG. 27, an axial end 12aa of the cylindrical wall 12a of the second annular sealing plate 12 may be exposed to the outside and is so bent as to occupy a position radially inwardly of the bearing, and the radially outwardly protruding annular projection 14*aa* engageable therewith in the axial direction may be formed on the overhang portion 14*a* in the first annular sealing plate 11. In the case of this arrangement, any possible separation of the first and second annular sealing plates 11 and 12 in a condition having not yet been assembled can be prevented.

Conversely, the radially outer edge of the radial wall 11*b* of the first annular sealing plate 11 may be exposed, and the overhang portion 16*d* on the cylindrical wall 12*a* of the second annular sealing plate 12 may be formed with the radially inwardly protruding annular projection 16*da* (FIG. 26) engageable with an radially outer edge of the radial wall 11*b* of the first annular sealing plate 11 then exposed.

Figure 28:
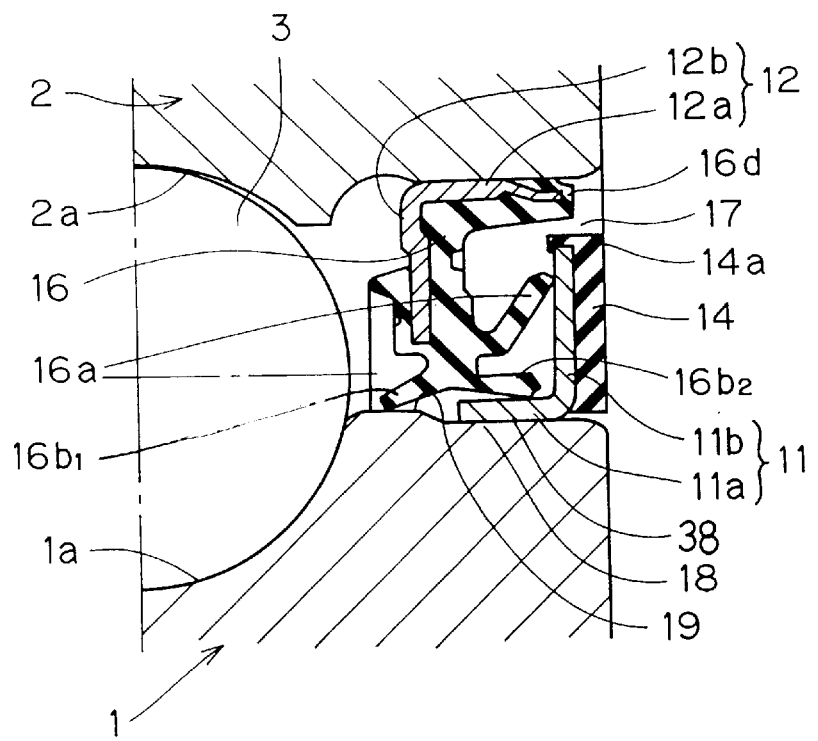
FIG. 28 is a fragmentary sectional view of the wheel bearing according to a six preferred embodiment in the fourth aspect of the present invention.

FIG. 28 illustrates a still further embodiment according to the fourth aspect of the present invention. The embodiment shown in FIG. 28 is substantially similar to that shown in FIG. 23, except that in the embodiment of FIG. 28, in place of the elastic radial sealing lip 16*b* protruding outwardly from the elastic member 16 shown in FIG. 23, two elastic radial sealing lips 16*b*1 and 16*b*2 are employed. The elastic radial sealing lip 16*b*1 has its free end portion extending slantwise in a direction inwardly of the bearing while the elastic radial sealing lip 16*b*2 has its free end portion extending slantwise in a direction outwardly of the bearing.

The use of the elastic radial sealing lip 16*b*2 extending slantwise in a direction outwardly of the bearing enhances an effect of preventing water from ingressing from the outside of the bearing into the interior of the bearing. The elastic radial sealing lip 16*b*1 having its free end portion extending slantwise in a direction inwardly of the bearing functions to prevent the grease from leaking to the outside of the bearing. Other structural features of the sealing device 5 employed in the embodiment shown in FIG. 28 are substantially similar to those employed in the embodiment shown in FIG. 23.

Figure 29:
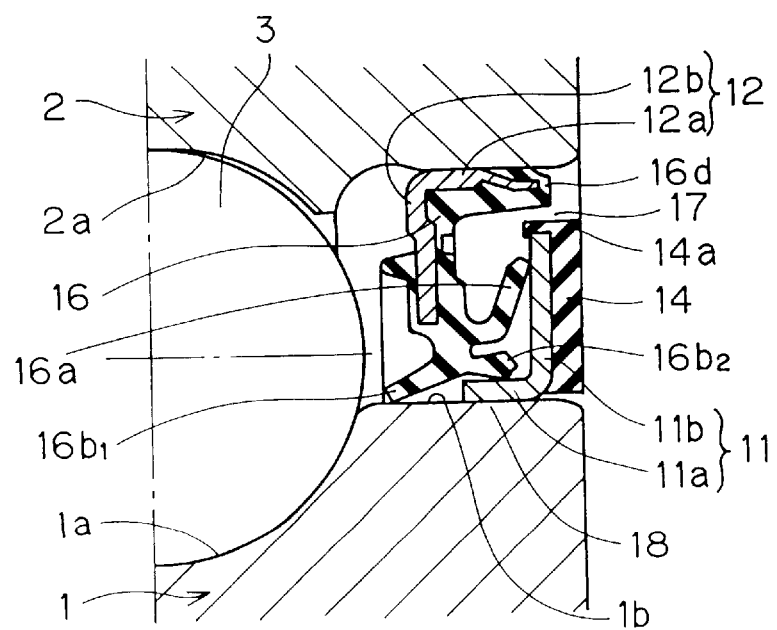
FIG. 29 is a fragmentary sectional view of the wheel bearing according to a seventh preferred embodiment in the fourth aspect of the present invention.

A yet further embodiment according to the fourth aspect of the present invention is shown in FIG. 29. The embodiment of FIG. 29 is substantially similar to that shown in FIG. 28, except that in the embodiment of FIG. 29, the outer peripheral surface 1*b* of the inner member 1 delimited between he raceway 1*a* and the annular end face of the inner member 1 is made flat. In other words, the annular depression 38 employed in the inner member 1 shown in FIG. 28 is eliminated. The inner member 1 is comprised of an inner race. Other structural features of the sealing device 5 employed in the embodiment shown in FIG. 29 are substantially similar to those employed in the embodiment shown in FIG. 28.

Where the outer peripheral surface 1*b* of the inner member 1 is made flat and without any annular depression, the entire section of the sealing device 5 may be smaller than that shown in FIG. 28, but a relatively large sliding space can be available for the elastic radial sealing lip 16*b*1 which serves as a grease sealing lip and which extends slantwise in a direction inwardly of the bearing. For this reason, the space defined in the bearing in an axial direction thereof can be reduced, resulting in a large freedom of design choice. For a given space in the axial direction, the bearing span can be increased, resulting in increase of the rigidity.

It is to be noted that in any one of the embodiments shown respectively in FIGS. 23 to 27, the outer peripheral surface of the inner member 1 delimited between the raceway 1*a* and the annular end face of the inner member 1 may be made flat as is the case with that shown in FIG. 29. In other words, the outer peripheral surface 19 in its entirety may be a cylindrical surface of the same diameter with no annular depression 38 employed.

Figure 30:
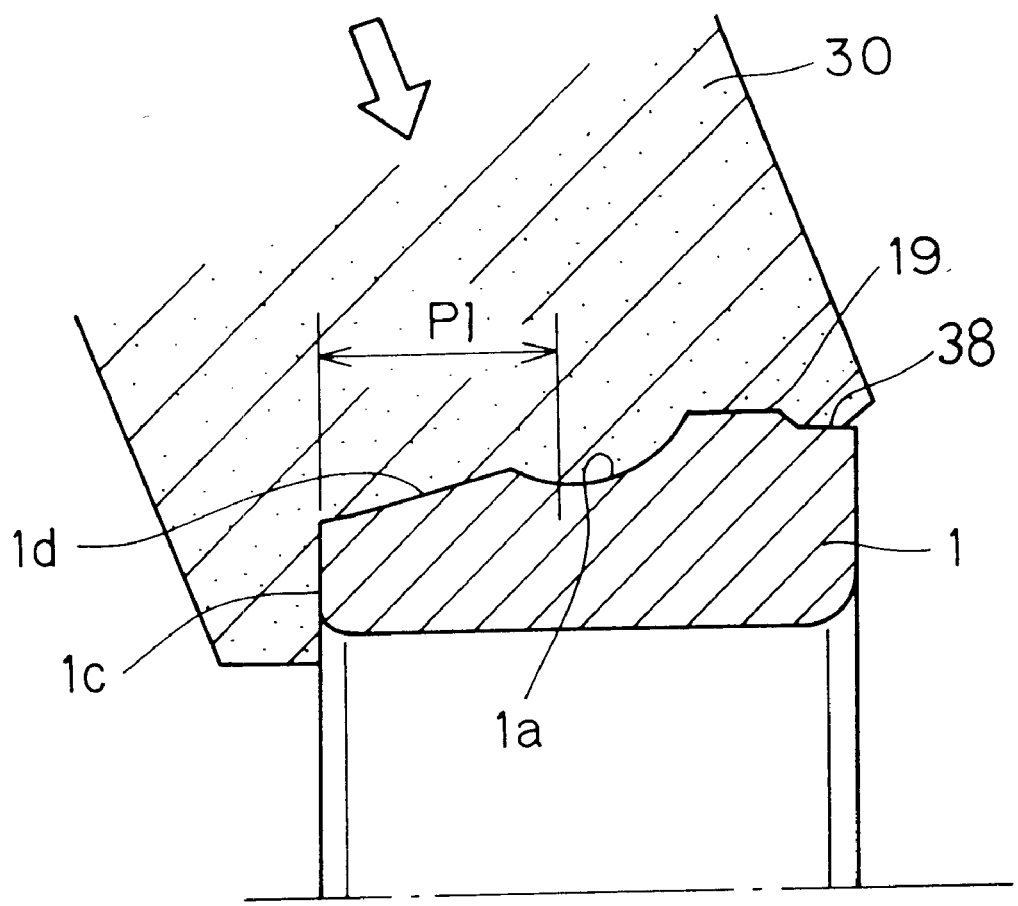
FIG. 30 is an explanatory diagram showing an example of machining an inner race.

In any one of the foregoing embodiments except for that shown in FIG. 29, (that is, in any one of the foregoing embodiments in which the annular depression 38 is formed in the outer peripheral surface of the inner member 1), various portion of the inner member 1 which eventually serves as the inner race are simultaneously ground by the use of an integrated grinding stone 40 as shown in FIG. 30. In other words, a reduced diameter end face 1*c*, a counter-bore portion 1*d*, a raceway 1*a*, an outer peripheral surface 19 and an annular depression 38, all found in the inner member 1, are simultaneously ground by the use of the integrated grinding stone 40. The grinding stone 40 is urged slantwise towards the inner member 1 as shown by the arrow in FIG. 30 to perform an angular cutting. The reason for the simultaneous grinding of the various parts of the inner member 1 is for the purpose of increasing the concentricity of the various parts of the inner member 1 and also for the purpose of precisely machining to exactly attain a pitch P1 between the reduced diameter end face 1*c* and the raceway 1*a*. This pitch P1 is associated with the bearing gap.

Embodiments shown respectively in FIGS. 31 to 36 pertains to those according to the fifth aspect of the present invention. In these embodiments, component parts similar to those shown in connection with the previously described embodiments are shown by like reference numerals.

Figure 31:
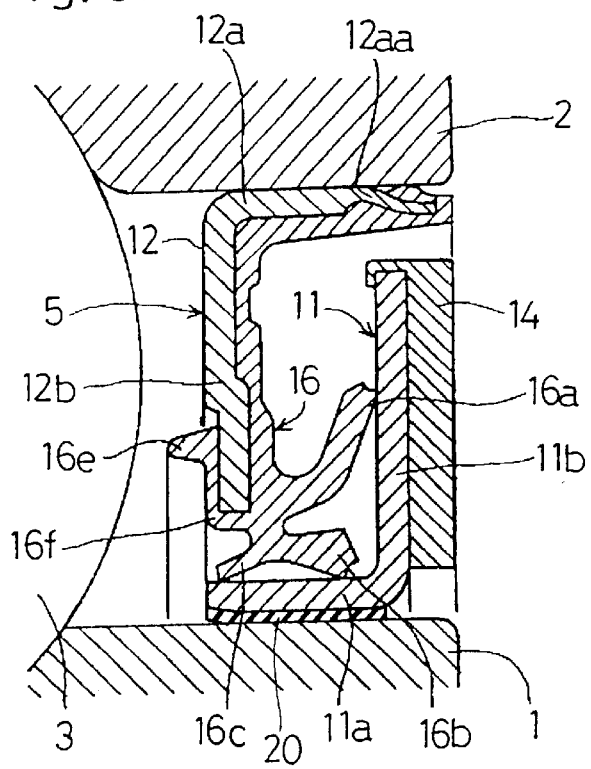
FIG. 31 is a fragmentary sectional view of the sealing device according to a first preferred embodiment in the fifth aspect of the present embodiment.

In the embodiment shown in FIG. 31, the sealing device 5 is shown as applied to the rolling bearing of a type in which the inner race 1 is rotatable. The sealing device 5 shown therein includes the slinger (the first annular sealing plate) 11 being a metallic member on the side of the inner race 1 and mounted on an outer peripheral surface of an axial end of the inner race 1, a core metal (the second annular sealing plate) 12 being a metal member on the side of the outer race 2 and mounted on an inner peripheral surface of an axial end of the outer race of the bearing, a sealing member 16 mounted on the core metal 12 and slidingly engaged with the slinger 11, an annular rubber magnet 14 bonded by vulcanization coaxially to an outer side face of the slinger 11 and having a magnetized portion, and an elastic member 20 interposed between the slinger 11 and the inner member 1 and made of a material dissimilar to that of the rubber magnet (elastic member) 14.

The slinger 11 is formed with a cylindrical wall 11*a* and a flange (the radial wall) 11*b* radially outwardly extending from an axially inner end of the cylindrical wall 11*a* in a direction towards the outer race 2, and the core metal 12 is formed with a cylindrical wall 12*a* press-fitted on an inner peripheral surface of the corresponding axial end of the outer race 2 and a flange (the radial wall) 12*b* radially inwardly extending from an axially inner end of the cylindrical wall 12*a* adjacent the row of the rolling element 3 in a direction towards the inner race 1. The axially outer end 12*aa* of the cylindrical wall 12*a* of the core metal 12 is somewhat inwardly bent to accommodate the sealing member 16.

Figure 36A:
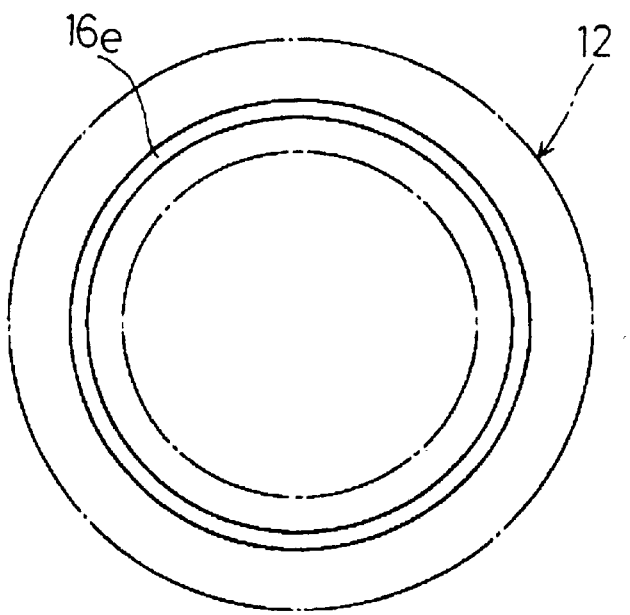
FIG. 36A is a schematic plan view showing an example of a projection employed in the sealing device shown in FIG. 31.

The sealing member 16 includes two elastic radial sealing lips 16*b* and 16*c* slidingly engageable with an inner peripheral surface of the cylindrical wall 11*a* of the slinger 11 and an elastic axial sealing lip 16*a* slidingly engageable with an annular inner surface of the slinger 11, and an angled annular projection 16*e* is integrally formed with a free end of a generally L-shaped bent portion 16*f* on one side opposite to the elastic axial sealing lip 16*a*. The sealing member 16 is mounted on the axially outer end 12*aa* of the cylindrical wall 12*a* and the flange 12*b* of the core metal 12 with the annular projection 16*e* positioned on an outer peripheral surface of the flange 12*b*. As schematically shown in FIG. 36A, the annular projection 16e is so formed as to be of a ring-shape extending circumferentially and as to protrude axially inwardly towards the row of the rolling elements 3. In other words, the embodiment of FIG. 31 is substantially similar to the embodiment according to the first aspect of the present invention shown in FIG. 1, except for the annular projection 16e added in accordance with the embodiment shown in FIG. 31.

Figure 36B:
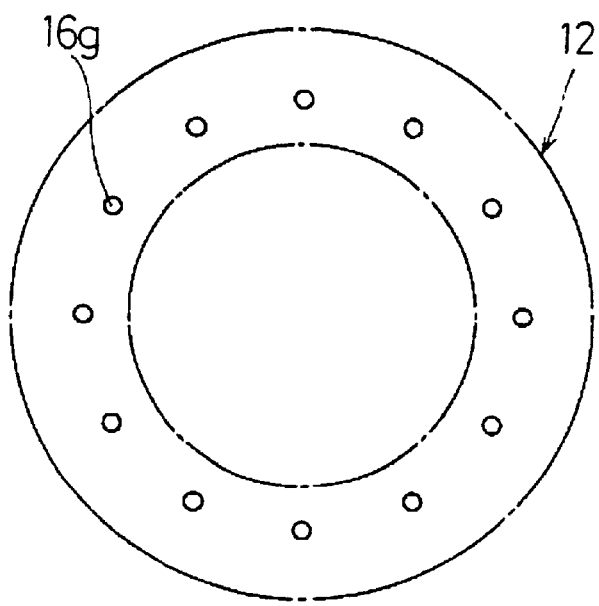
FIG. 36B is a schematic plan view of a modified form of the projection.
Figure 37:
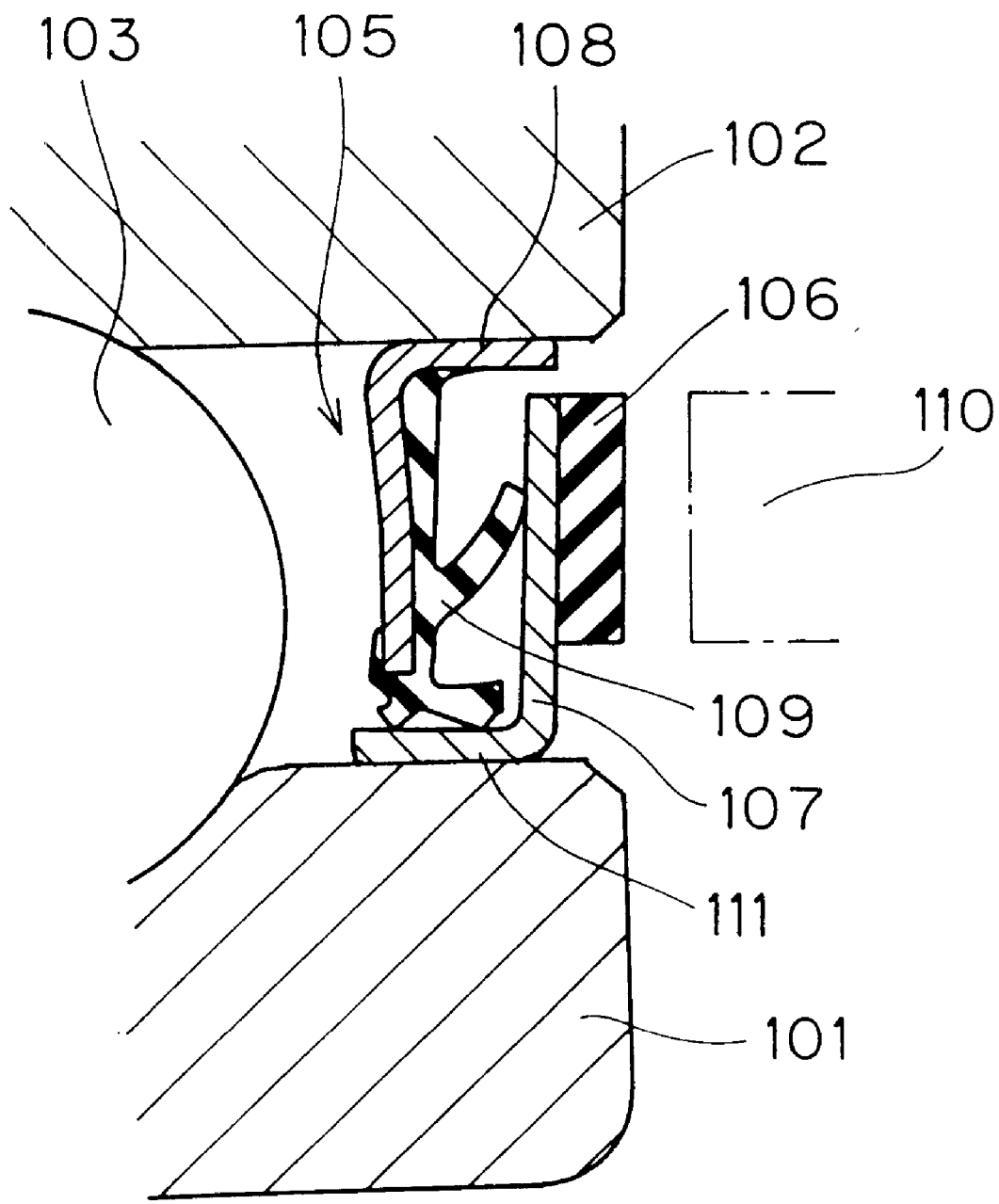
FIG. 37 is a fragmentary sectional view of one prior art sealing device employed in the wheel bearing.
Figure 38:
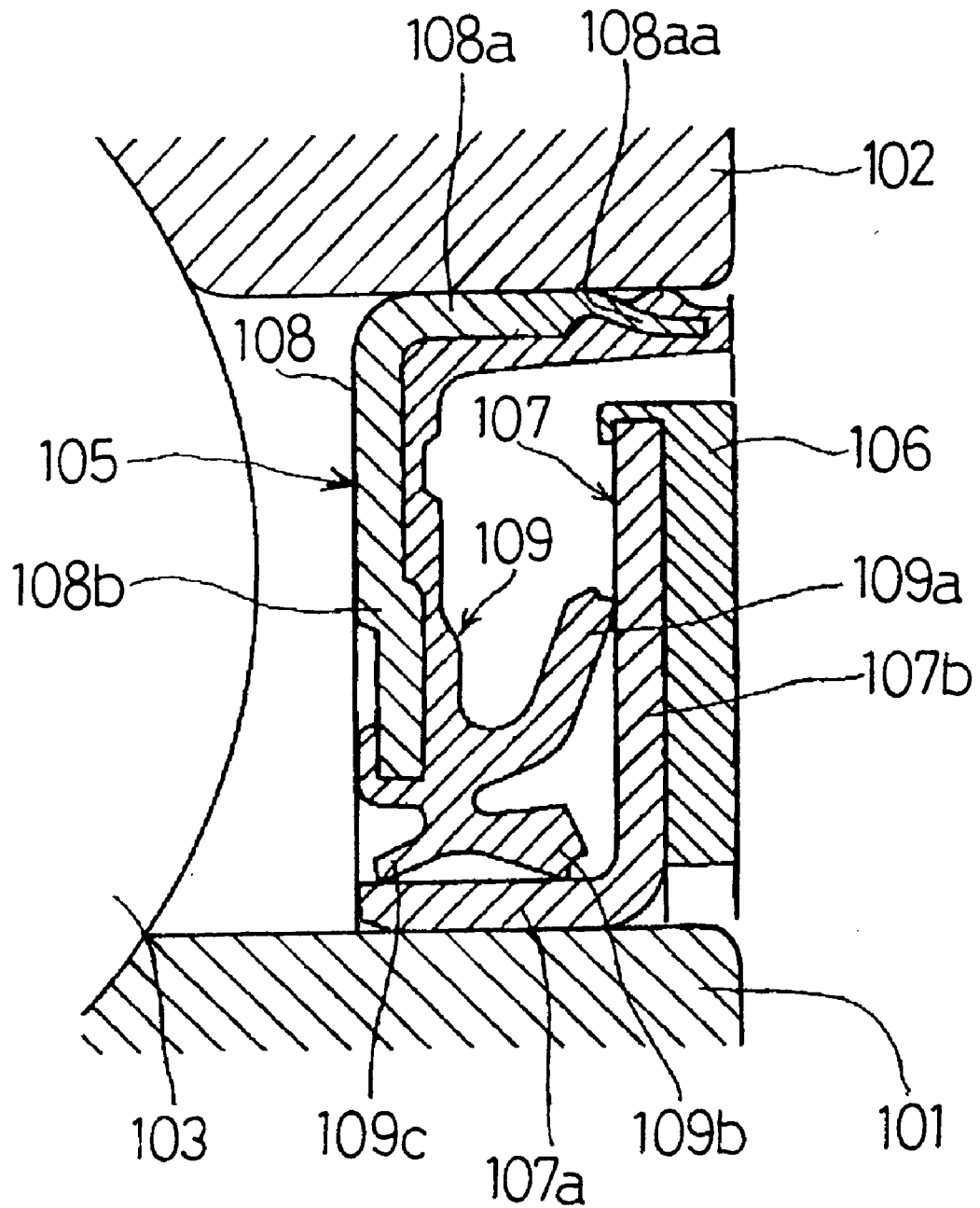
FIG. 38 is a fragmentary sectional view of another prior art sealing device employed in a rolling bearing.
Figure 39:
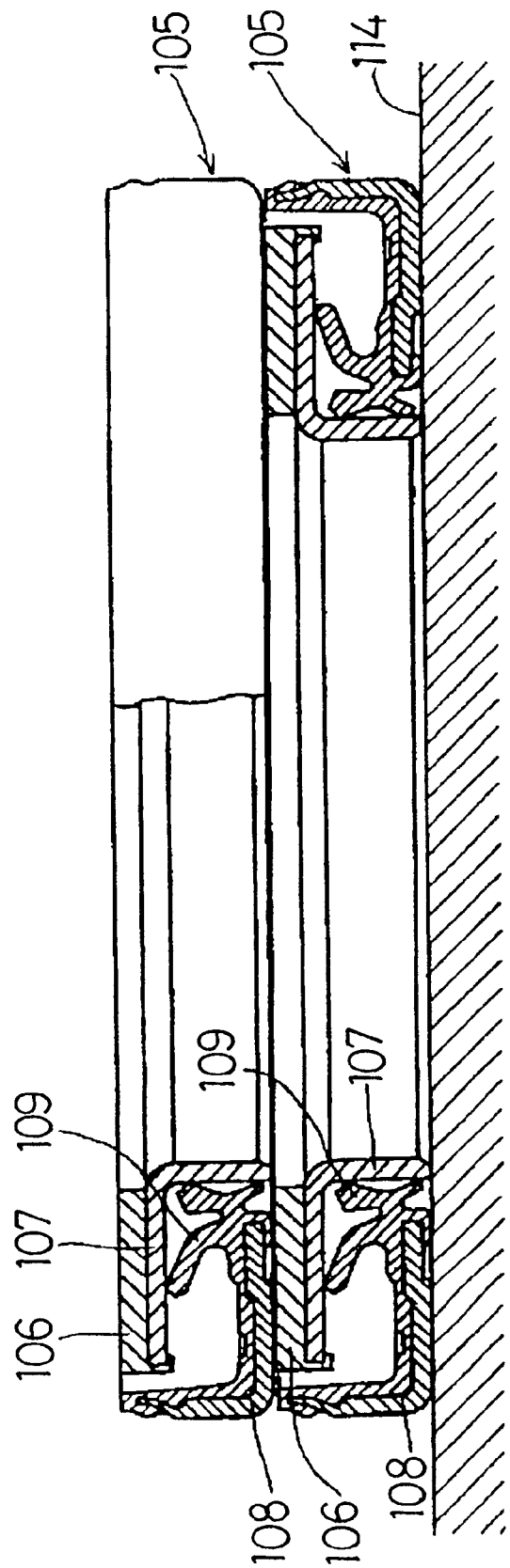
FIG. 39 is an explanatory diagram showing the manner in which the prior art sealing devices are stacked one above the other on the support table.

Although the annular projection 16e has been formed in a ring-shape integrally with the sealing member 16, it may be possible that in place of the annular projection 16e, a plurality of separate projections 16g extending discontinuously in the circumferential direction may be formed as schematically shown in FIG. 36B, in which case the minimum required number of those separate projections 16g may be three.

The annular rubber magnet 14 bonded by vulcanization coaxially to the outer peripheral side of the flange 11b of the slinger 11 is prepared by mixing rubber material with a powder of magnetic particles of, for example, barium (Ba) ferrite, vulcanizing and molding the mixture, and magnetizing N and S poles alternating in the circumferential direction.

In order to increase the strength of the magnetic field developed by the rubber magnet 14 to facilitate a speed detection during a speed control, the slinger 11 which is the metallic member mounted on the rotary side is preferably made of a magnetic material. Examples of this magnetic material are many, but ferrite stainless steels are preferred because they have a corrosion resistance effective to suppress rusting. Of those ferrite stainless steel materials, SUS 430 now on mass production is more preferred because of an excellent workability.

Figure 35:
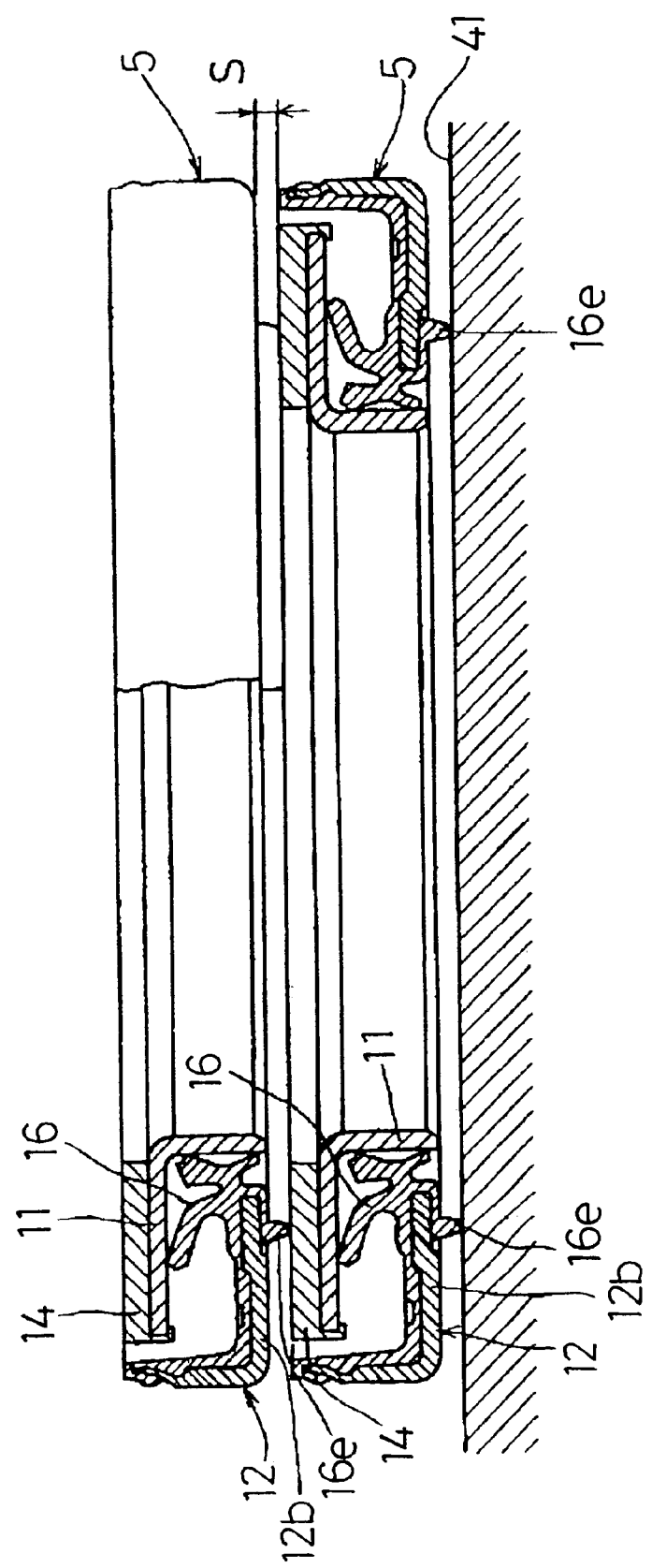
FIG. 35 is a sectional view showing the manner in which the sealing devices according to the embodiment shown in FIG. 31 are stacked one above the other on a support table.

When the sealing device 5 is to be press-fitted to the bearing, as shown in FIG. 35, a plurality of the sealing devices 5 of an identical structure are placed on a support table 41 with the core metal 12 oriented downwards while the slinger 11 bonded by vulcanization with the rubber magnet 14 is oriented upwards. In such case, since the outer side face of the flange 12b of the core metal 12 of each of the sealing devices 5 is provided with the annular projection 16e formed integrally with the sealing member 16 in a continuous ring form, the rubber magnet 14 in one of the sealing devices 5 and the core metal 12 in the other of the sealing devices 5 stacked immediately above such one of the sealing devices 5 will not contact with each other when the sealing devices 5 are stacked one above the other on the support table 41, except for a tip of the annular projection 16e in such other of the sealing devices 5. Accordingly, in the stacked condition, a space S corresponding to the amount of protrusion of the annular projection 16e from the outer side face of the flange 12b of the core metal 12 can be obtained between the neighboring sealing devices 5.

The presence of the space S serves to weaken the magnetic force of attraction exerted by the rubber magnet 14 to attract the core metal 12 and does therefore prevents the neighboring sealing devices 5 from being magnetically attracted to each other, thereby allowing the sealing devices 5 to be transported one by one into a chute by a handling device of an automatic press-fitting machine with no trouble to thereby accomplish an automatic press-fitting of each of the sealing devices into the corresponding bearing one at a time.

Figure 32:
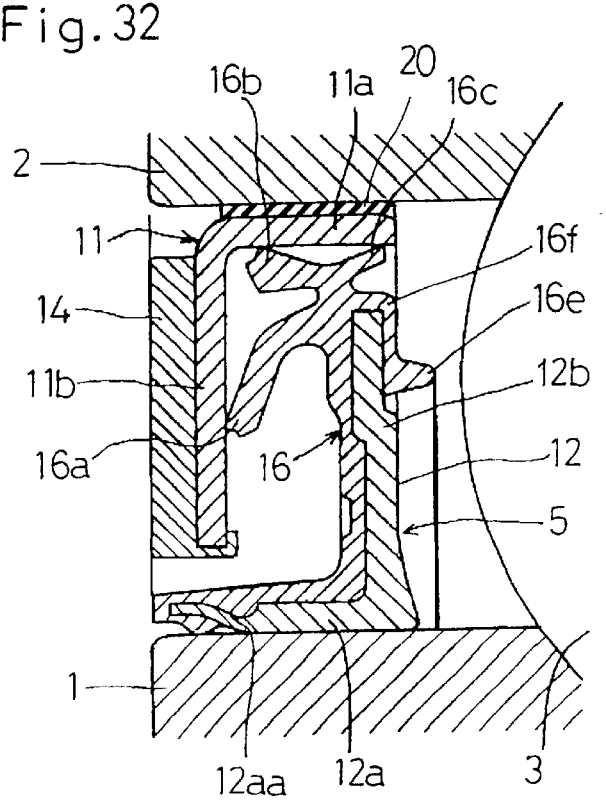
FIG. 32 is a fragmentary sectional view of the sealing device according to a second preferred embodiment in the fifth aspect of the present invention.

In the embodiment shown in FIG. 32, the sealing device 5 is shown as applied to the rolling bearing of a type in which the outer race 2 is rotatable. The sealing device 5 shown therein includes the slinger (the first annular sealing plate) 11 being a metallic member on the side of the outer race 2 and mounted on an inner peripheral surface of an axial end of the outer race 2, a core metal (the second annular sealing plate) 12 being a metal member on the side of the inner race 1 and mounted on an outer peripheral surface of an axial end of the inner race 1, a sealing member 16 mounted on the core metal 12 and slidingly engaged with the slinger 11, an annular rubber magnet 14 bonded by vulcanization coaxially to an outer side face of the flange 11b of the slinger 11 and having a magnetized portion, and an elastic member 20 interposed between the slinger 11 and the outer race 2. The angled annular projection 16e is formed integrally with the sealing member 16 as is the case with the previously described embodiment and is positioned on an outer side of the flange 12b of the core metal 12 while extending continuously in a circumferential direction (See FIG. 36A) so as to protrude inwardly of the bearing, that is, in a direction towards the row of the rolling elements 3. In place of the annular projection 16e, as is the case with the embodiment shown in FIG. 31 (See FIG. 36B), circumferentially discontinuous projections 16g may be formed, in which case the minimum required number of those discontinuous projections 16g is three.

Even in this embodiment shown in FIG. 32, as is the case with the embodiment shown in FIG. 35, the stack of the sealing devices 5 placed on the support table 41 with the core metal 12 in one of the sealing devices 5 positioned below the slinger 11 in the other of the sealing devices 5 which is bonded by vulcanization with the rubber magnet 14 are spaced from each other a distance corresponding to the space S which in turn corresponds to the amount of protrusion of the annular projection 16e. The presence of the space S between the neighboring sealing devices 5 prevents the neighboring sealing devices 5 from being magnetically attracted to each other, thereby allowing the sealing devices 5 to be automatically press-fitted into the corresponding bearing one at a time smoothly.

Figure 33:
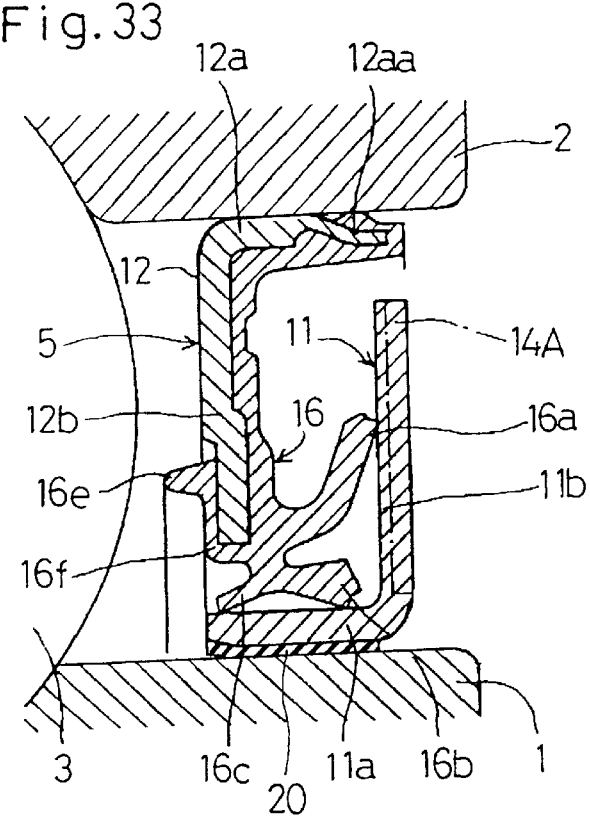
FIG. 33 is a fragmentary sectional view of the sealing device according to a third preferred embodiment in the fifth aspect of the present invention.

In the embodiment shown in FIG. 33, the sealing device 5 is shown as applied to the rolling bearing of a type in which the inner race 1 is rotatable, as is the case with the embodiment shown in FIG. 31. The sealing device 5 shown therein includes the slinger 11 mounted on an outer peripheral surface of an axial end of the inner race 1, a core metal 12 mounted on an outer peripheral surface of an axial end of the outer race 2, and a sealing member 16 mounted on the core metal 12 and slidingly engaged with the slinger 11. An outer side face of the flange 11b of the slinger 11 made of a magnetic material has a magnetized portion 14A in which opposite magnetic poles are magnetized alternately in a circumferential direction thereof The annular projection 16e is formed integrally with the sealing member 16 as is the case with the previously described embodiments and is positioned on the outer side surface of the flange 12b of the core metal 12. This annular projection 16e extends continuously in a circumferential direction thereof in a ring form (See FIG. 36A) so as to protrude inwardly of the bearing, that is, in a direction towards the row of the rolling elements 3.

Figure 34:
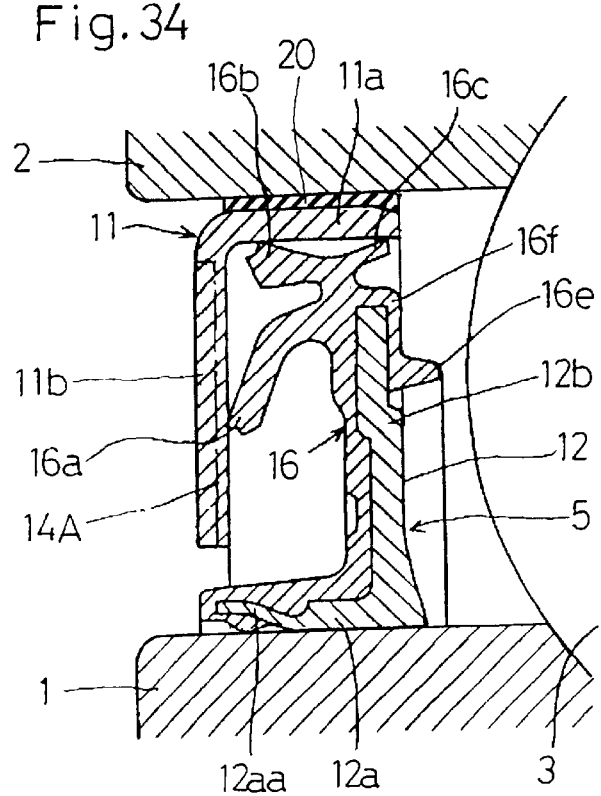
FIG. 34 is a fragmentary sectional view of the sealing device according to a fourth preferred embodiment in the fifth aspect of the present invention.

In the embodiment shown in FIG. 34, the sealing device 5 is shown as applied to the rolling bearing of a type in which the outer race 2 is rotatable. The sealing device 5 shown therein includes the slinger 11 mounted on an inner peripheral surface of an axial end of the outer race 2, a core metal 12 being a metal member on the side of the inner race 1 and mounted on an outer peripheral surface of an axial end of the inner race 1, and a sealing member 16 mounted on the core metal 12 and slidingly engaged with the slinger 11. An outer side face of the flange 11b of the slinger 11 made of a magnetic material has a magnetized portion 14A in which opposite magnetic poles are magnetized alternately in a circumferential direction thereof The annular projection 16e is formed integrally with the sealing member 16 as is the case with the previously described embodiments and is positioned on the outer side surface of the flange 12b of the core metal 12. This annular projection 16e extends continuously in a circumferential direction thereof in a ring form (See FIG. 36A) so as to protrude inwardly of the bearing, that is, in a direction towards the row of the rolling elements 3.

Even in any one of the embodiments shown respectively in FIGS. 33 and 34, the stack of the sealing devices 5 placed on the support table 41 are spaced from each other a distance corresponding to the space S which in turn corresponds to the amount of protrusion of the annular projection 16e, and are not therefore magnetically attracted to each other. Accordingly, as is the case with the embodiment shown in FIG. 31, the sealing devices 5 can be automatically press-fitted into the associated bearings one at a time smoothly. It is to be noted that the annular projection 16e of the type discussed above can be equally employed in the sealing device 5 of any one of the embodiments according to the second to fourth aspects of the present invention.

Also, instead of the use of the annular projection 16e or the discontinuous projections 16g, the core metal 12 which is a metallic member mounted on the side of the fixed member may be made of a non-magnetic material. Examples of this non-magnetic material are many, but austenite stainless steels are preferred because they have a corrosion resistance effective to suppress rusting. Of those austenite stainless steel materials, SUS 304 now on mass production is more preferred because of a required strength. The structure in which the core metal 12 is made of the non-magnetic material can be equally applied to the various embodiments according to the first to fourth aspects of the present invention shown in FIGS. 1, 15, 21 and 23, respectively.

Where the core metal 12 is made of the non-magnetic material, and when the sealing devices 5 are stacked on the support table 41, even though the magnetized portion, that is, the rubber magnet 14 or the magnetized portion 14A magnetized directly in the slinger 11 in one of the sealing devices 5 is brought into contact with the core metal 12 made of the non-magnetic material in the other of the sealing devices 5 that is positioned immediately above such one of the sealing devices 5, the magnetic force of attraction emanating from the magnetized portion does not act on the core metal 12 made of the non-magnetic material. Accordingly, the neighboring sealing devices 5 will not be magnetically attracted and, therefore, the sealing devices 5 can be supplied into the chute one at a time by the handling device of the automatic press-fitting machine with no trouble to thereby accomplish an automatic press-fitting of the sealing device 5 into the bearing.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel bearing which comprises an inner member, an outer member, a circular row of rolling elements interposed between the inner and outer members, and a sealing device for sealing an annular end space delimited between the inner and outer members, said sealing device comprising:

first and second annular sealing plates secured respectively to one of the first and second members and the other thereof, and disposed in face-to-face relation to each other;

each of the first and second annular sealing plates including a cylindrical wall and a radial wall assembled together to represent a generally L-shaped section;

the first annular sealing plate being mounted on one of the inner and outer members which is rotatable relative to the other of the inner and outer members, with the radial wall positioned on one side adjacent an exterior of the bearing;

a first elastic member mixed with a powder of magnetic particles and bonded by vulcanization to the radial wall of the first annular sealing plate, the first elastic member being formed with a magnetized portion in which opposite magnetic poles are formed alternately in a direction circumferentially thereof;

the cylindrical wall of the second annular sealing plate being spaced a slight radial gap from a free periphery of the radial wall of the first annular sealing plate; and the second sealing plate including an elastic sealing member, the elastic sealing member being formed integrally with a side sealing lip slidingly engageable with the radial wall of the first annular sealing plate and a radial sealing lip slidingly engageable with an outer peripheral surface of the one of the inner and outer members, which is rotatable, and adjacent an engagement surface of the first annular sealing plate with such one member.

2. The wheel bearing as claimed in claim 1, wherein the radial sealing lip of the second sealing plate is inclined so as to extend outwardly of the bearing.

3. The wheel bearing as claimed in claim 1, wherein the side sealing lip of the second annular sealing plate is provided at two locations. Spaced radially.

4. The wheel bearing as claimed in claim 1, wherein the first annular sealing plate is made of a ferrite stainless steel.

5. A sealing device included in a wheel bearing as defined in claim 1, wherein one of the first and second annular sealing plates which is on a fixed side is made of a metallic non-magnetic material.

6. The wheel bearing as claimed in claim 1, wherein an annular depression of a depth corresponding to a thickness of the first annular sealing plate is formed on the one of the first and second members, which is rotatable, and wherein the cylindrical wall of the first annular sealing plate is press-fitted around an outer peripheral surface of the annular depression.

7. The wheel bearing a claimed in claim 1, wherein at least one of a free peripheral edge of the radial wall of the first annular sealing plate and the cylindrical wall of the second sealing plate is provided with an overhang portion defined by a portion of the elastic member integrated with the annular sealing plate and wherein a maximum diameter portion of the free peripheral edge of the radial wall of the first annular sealing plate including this overhang portion has a diameter greater than a minimum diameter portion of an axial free end of the cylindrical wall of the second annular sealing plate and is positioned inwardly of the bearing form the minimum diameter portion.

8. A sealing device including a wheel bearing as defined in claim 1, wherein one of the first and second annular sealing plates which is on a fixed side is made of a metal and wherein said fixed side annular sealing plate or the elastic sealing member mounted thereon is formed with a projection protruding inwardly of the wheel bearing, said projection being formed so as to be continuous or discontinuous.

9. A sealing device as claimed in claim 8, wherein in place of the first elastic member including the magnetized portion, the magnetized portion is formed by directly magnetizing the radial wall of the one of the first and second annular sealing plates which is on a rotatable side.

* * * * *

UNITED STATES PATENT AND TRADEMARK OFFICE
CERTIFICATE OF CORRECTION

PATENT NO. : 6,637,754 B1
DATED : October 28, 2003
INVENTOR(S) : Hisashi Ohtsuki et al.

It is certified that error appears in the above-identified patent and that said Letters Patent is hereby corrected as shown below:

<u>Title page,</u>
Item [75], Inventors, please add -- Kenro ADACHI, Iwata (JP) --.

Signed and Sealed this

Ninth Day of March, 2004

JON W. DUDAS
*Acting Director of the United States Patent and Trademark Office*